US010974825B2

(12) United States Patent
Sun et al.

(10) Patent No.: US 10,974,825 B2
(45) Date of Patent: Apr. 13, 2021

(54) AERIAL SYSTEM INCLUDING FOLDABLE FRAME ARCHITECTURE

(71) Applicant: Hangzhou Zero Zero Technology Co., Ltd., Zhejiang (CN)

(72) Inventors: Wei Sun, Zhejiang (CN); Zheng Qu, Zhejiang (CN); Tong Zhang, Zhejiang (CN)

(73) Assignee: HANGZHOU ZERO ZERO TECHNOLOGY CO., LTD., Zhejiang (CN)

( * ) Notice: Subject to any disclaimer, the term of this patent is extended or adjusted under 35 U.S.C. 154(b) by 259 days.

(21) Appl. No.: 16/156,109

(22) Filed: Oct. 10, 2018

(65) Prior Publication Data

US 2019/0106208 A1    Apr. 11, 2019

Related U.S. Application Data

(60) Provisional application No. 62/570,921, filed on Oct. 11, 2017.

(51) Int. Cl.
*B64C 27/52* (2006.01)
*B64C 27/08* (2006.01)
*B64C 39/02* (2006.01)

(52) U.S. Cl.
CPC ............. *B64C 27/52* (2013.01); *B64C 27/08* (2013.01); *B64C 39/024* (2013.01); *B64C 2201/027* (2013.01); *B64C 2201/108* (2013.01); *B64C 2201/127* (2013.01)

(58) Field of Classification Search
CPC ........ B64C 2201/127; B64C 2201/108; B64C 2201/027; B64C 27/08; B64C 27/52
See application file for complete search history.

(56) References Cited

U.S. PATENT DOCUMENTS

| 10,351,234 B1* | 7/2019 | Dennis | B64C 27/08 |
|---|---|---|---|
| 2016/0272312 A1* | 9/2016 | Mallard | B64C 29/0033 |
| 2017/0001721 A1* | 1/2017 | Saika | B64C 39/024 |

(Continued)

FOREIGN PATENT DOCUMENTS

| CN | 103332293 A | 10/2013 |
|---|---|---|
| CN | 104044734 A | 9/2014 |

(Continued)

OTHER PUBLICATIONS

International Search Report and Written Opinion (International Application No. PCT/IB2018/057862;); dated Feb. 12, 2019; 10 pages.

*Primary Examiner* — Philip J Bonzell
*Assistant Examiner* — Tye William Abell
(74) *Attorney, Agent, or Firm* — Saliwanchik, Lloyd & Eisenschenk

(57) ABSTRACT

A frame assembly for an aerial system includes a body and first and second rotor assemblies. The first and second rotor assemblies are coupled to the body by respective hinges. The first and second rotor assemblies are movable between a deployed position and a stowed position. Each rotor assembly includes a shaft assembly coupled to the hinge at one end and having a rotor assembly mounted to an opposite end. A rotary actuator is coupled between the rotor assembly and the shaft assembly and is configured to controllably rotate the rotor assembly relative to the shaft assembly.

20 Claims, 25 Drawing Sheets

(56) References Cited

U.S. PATENT DOCUMENTS

| | | | | |
|---|---|---|---|---|
| 2017/0259914 A1* | 9/2017 | Bevirt | .................... | B64D 27/24 |
| 2018/0265189 A1* | 9/2018 | Zhang | .................... | B64C 27/20 |
| 2018/0297695 A1* | 10/2018 | Ramirez-Serrano | .... | B64C 27/08 |
| 2018/0297697 A1* | 10/2018 | Tunekawa | .......... | B64C 29/0025 |
| 2019/0212755 A1* | 7/2019 | Oberndorfer | ........ | G05D 1/0816 |

FOREIGN PATENT DOCUMENTS

| | | |
|---|---|---|
| CN | 104743110 A | 7/2015 |
| CN | 205872435 U | 1/2017 |

\* cited by examiner

AERIAL SYSTEM INCLUDING FOLDABLE FRAME ARCHITECTURE

CROSS-REFERENCE TO RELATED APPLICATION

This application claims the benefit of U.S. Provisional Patent Application Ser. No. 62/570,921, filed on Oct. 11, 2017, all of which is hereby incorporated by reference in its entirety for all purposes.

TECHNICAL FIELD

This invention relates generally to the aerial system field, and more specifically, to a foldable drone architecture and related flight control methods.

BACKGROUND OF THE INVENTION

Fully autonomous aerial robots or drones are becoming increasingly popular and many uses. For example, recently, so-called "selfie drones" have become a popular consumer product category. The hovering ability of those selfie drones enables photo and video taking around people from totally different angles and perspectives. However, these types of consumer drones need to be efficient, safe, small and light in order to be successful.

The present invention is aimed at one or more of the problems identified above.

SUMMARY OF THE INVENTION

In one embodiment of the present invention, a frame assembly for an aerial system is provided. The aerial system may be, for example, a twin rotor drone with a propeller guard system. The frame assembly allows the aerial system to fold in a compact arrangement that is portable while offering fully protection when in flight.

In another embodiment of the present invention, a frame assembly for an aerial system is provided. The frame assembly includes a body and first and second rotor assemblies. The first and second rotor assemblies are coupled to the body by respective hinges. The first and second rotor assemblies are movable between a deployed position and a stowed position. Each rotor assembly includes a shaft assembly coupled to the hinge at one end and having a rotor assembly mounted to an opposite end. A rotary actuator is coupled between the rotor assembly and the shaft assembly and is configured to controllably rotate the rotor assembly relative to the shaft assembly.

In a further embodiment of the present invention, an aerial system is provided. The aerial system includes a fuselage body and a lift assembly coupled to the fuselage body. The fuselage body includes a pair of opposing sidewalls extending between a first endwall and an opposite second endwall along a longitudinal axis. The pair of opposing sidewalls are spaced apart a distance measured along a lateral axis that is perpendicular to the longitudinal axis. The lift assembly includes a first rotor assembly and a second rotor assembly. The first rotor assembly extends outwardly from a first sidewall of the pair of opposing sidewalls. The second rotor assembly extends outwardly from a second sidewall of the pair of opposing sidewalls. The first rotor assembly includes a first lift mechanism and a first shaft assembly that is coupled between the first lift mechanism and the fuselage body for supporting the first lift mechanism from the fuselage body. The first shaft assembly extends outwardly from the first sidewall at a first oblique angle measured from the longitudinal axis. The first shaft assembly is pivotably coupled to the first sidewall such that the first rotor assembly is pivotable about a first pivot axis that is parallel to the longitudinal axis. The second rotor assembly includes a second lift mechanism and a second shaft assembly that is coupled between the second lift mechanism and the fuselage body for supporting the second lift mechanism from the fuselage body. The second shaft assembly extends outwardly from the second sidewall at a second oblique angle measured from the longitudinal axis. The second shaft assembly is pivotably coupled to the second sidewall such that the second rotor assembly is pivotable about a second pivot axis that is parallel to the longitudinal axis.

In another embodiment of the present invention, a lift assembly for use with an aerial system is provided. The lift assembly includes a first rotor assembly and a second rotor assembly. The first rotor assembly extends outwardly from a first sidewall of a fuselage body. The second rotor assembly extends outwardly from an opposite second sidewall of the fuselage. The first rotor assembly includes a first lift mechanism and a first shaft assembly that is coupled between the first lift mechanism and the fuselage body for supporting the first lift mechanism from the fuselage body. The first shaft assembly extends outwardly from the first sidewall at a first oblique angle measured from a longitudinal axis defined along the fuselage body. The first shaft assembly is pivotably coupled to the first sidewall such that the first rotor assembly is pivotable about a first pivot axis that is parallel to the longitudinal axis. The second rotor assembly includes a second lift mechanism and a second shaft assembly that is coupled between the second lift mechanism and the fuselage body for supporting the second lift mechanism from the fuselage body. The second shaft assembly extends outwardly from the second sidewall at a second oblique angle measured from the longitudinal axis. The second shaft assembly is pivotably coupled to the second sidewall such that the second rotor assembly is pivotable about a second pivot axis that is parallel to the longitudinal axis.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings.

Figure 1:
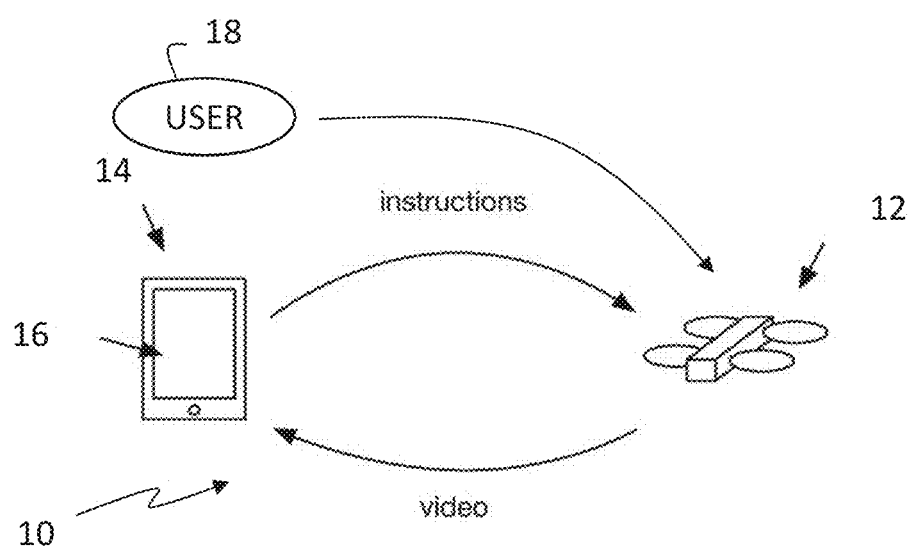
FIG. 1 is a schematic representation of an aerial system and a system for controlling the aerial system, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION OF THE INVENTION

The following description of the embodiments of the invention is not intended to limit the invention to these embodiments, but rather to enable any person skilled in the art to make and use this invention. With reference to the drawings and in operation, a system 10 for controlling an aerial system 12, for example a drone or other unmanned aerial vehicle, may be provided. The system 10 may include a remote device 14 with a control client 16. The control client 16 provides a user interface that allows a user 18 to send instructions to the aerial system 12 to control operation thereof. As discussed in more depth below, the aerial system 12 may include one or more cameras for obtaining pictures and/or video which may be sent to the remote device 14 and/or stored in memory on the aerial system 12.

In one aspect of the present invention, the aerial system 12 includes a frame assembly 70. The frame assembly 70, as detailed below, allows the assembly to fold into a compact size when not in use while providing protection to the components of the system 10 and aerial system 12 during flight.

In one aspect of the present invention, the aerial system 12 may include an obstacle detection and avoidance system 50. The obstacle detection and avoidance system 50 may include a pair of cameras 52A, 52B that are utilized to provide obstacle detection and avoidance (see below). The obstacle detection and avoidance system 50 may detect a direction of travel of the aerial system 12 and may automatically adjust an orientation of the cameras 52A, 52B to align with the aerial system 12 direction of travel. Thus, the cameras 52A, 52B may automatically face the direction that the aerial system 12 is moving to improve an efficiency and accuracy of obstacle detection and avoidance in the travel path of the aerial system 12.

Overview of the System 10 and the Aerial System 12.

An exemplary aerial system 12 and control system 10 is shown in FIGS. 1-4. The control client 16 of the aerial system 12 functions to receive data from the aerial system 12, including video images and/or video, and control visual display on the remote device 14. The control client 16 may also receive operation instructions and facilitate aerial system 12 remote control based on operation instructions. The control client 16 is preferably configured to execute on a remote device 14, but can alternatively be configured to execute on the aerial system 12 or on any other suitable system. As discussed above, and more fully below, the aerial system 12 may be controlled solely without direct or physical interaction with the remote device 14.

The control client 16 can be a native application (e.g., a mobile application), a browser application, an operating system application, or be any other suitable construct.

The remote device 14 executing the control client 16 functions to display the data (e.g., as instructed by the control client 16), receive user inputs, compute the operation instructions based on the user inputs (e.g., as instructed by the control client 16), send operation instructions to the aerial system 12, store control client information (e.g., associated aerial system identifiers, security keys, user account information, user account preferences, etc.), or perform any other suitable functionality. The remote device 14 can be a user device (e.g., smartphone, tablet, laptop, etc.), a networked server system, or be any other suitable remote computing system. The remote device 14 can include one or more: outputs, inputs, communication systems, sensors, power sources, processing systems (e.g., CPU, memory, etc.), or any other suitable component. Outputs can include: displays (e.g., LED display, OLED display, LCD, etc.), audio speakers, lights (e.g., LEDs), tactile outputs (e.g., a tixel system, vibratory motors, etc.), or any other suitable output. Inputs can include: touchscreens (e.g., capacitive, resistive, etc.), a mouse, a keyboard, a motion sensor, a microphone, a biometric input, a camera, or any other suitable input. Communication systems can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system. Sensors can include: orientation sensors (e.g., accelerometer, gyroscope, etc.), ambient light sensors, temperature sensors, pressure sensors, optical sensors, acoustic sensors, or any other suitable sensor. In one variation, the remote device 14 can include a display (e.g., a touch-sensitive display including a touchscreen overlaying the display), a set of radios (e.g., Wi-Fi, cellular, BLE, etc.), and a set of orientation sensors. However, the remote device 14 can include any suitable set of components.

The aerial system 12 functions to fly within a physical space, capture video, stream the video in near-real time to the remote device 14, and operate based on operation instructions received from the remote device 14.

The aerial system 12 can additionally process the video (e.g., video frames) prior to streaming the video to the remote device 14 and/or audio received from an onboard audio sensor; generate and automatically operate based on its own operation instructions (e.g., to automatically follow a subject); or perform any other suitable functionality. The aerial system 12 can additionally function to move the optical sensor's field of view (FOV) within the physical space. For example, the aerial system 12 can control macro movements (e.g., large FOV changes, on the order of meter adjustments), micro movements (e.g., small FOV changes, on the order of millimeter or centimeter adjustments), or any other suitable movement.

The aerial system 12 can perform certain functionality based on onboard processing of sensor data from onboard sensors. This functionality may include, but is not limited to:
Take-off and landing;
Owner recognition;
Facial recognition;
Speech recognition;
Facial expression and gesture recognition; and,
Control, e.g., motion, of the aerial system based on owner, facial, expression and gesture recognition, and speech recognition.

Figure 2:
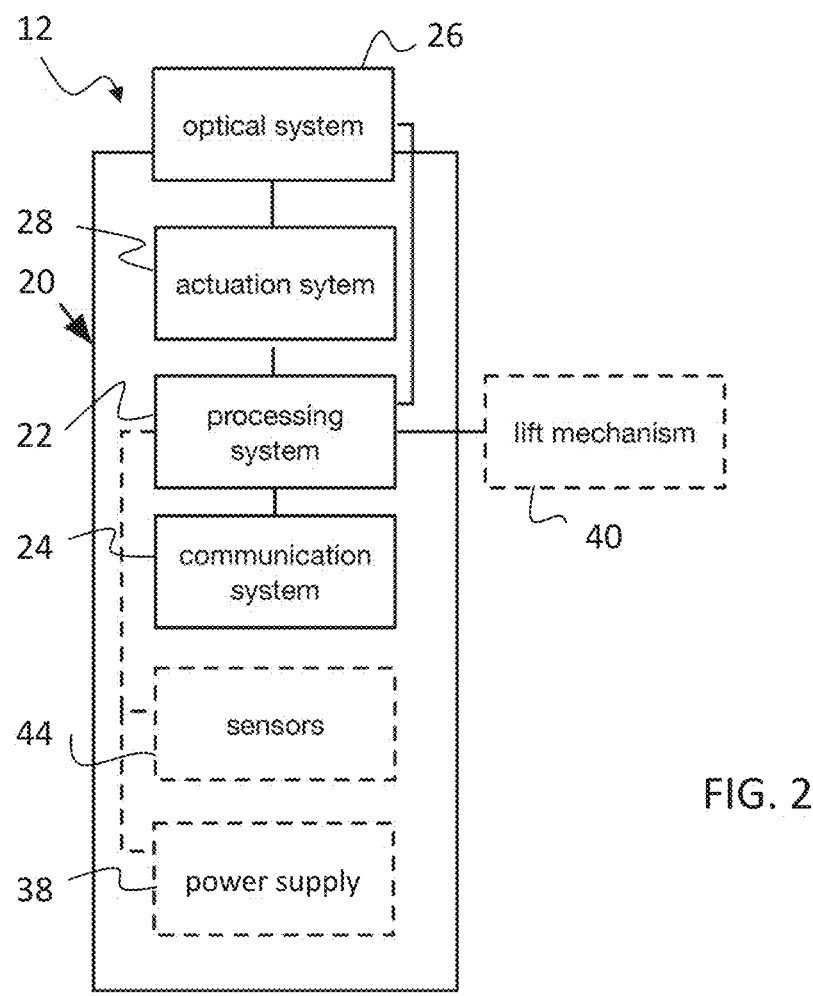
FIG. 2 is a second schematic representation of the aerial system, according to an embodiment of the present invention.
Figure 3:
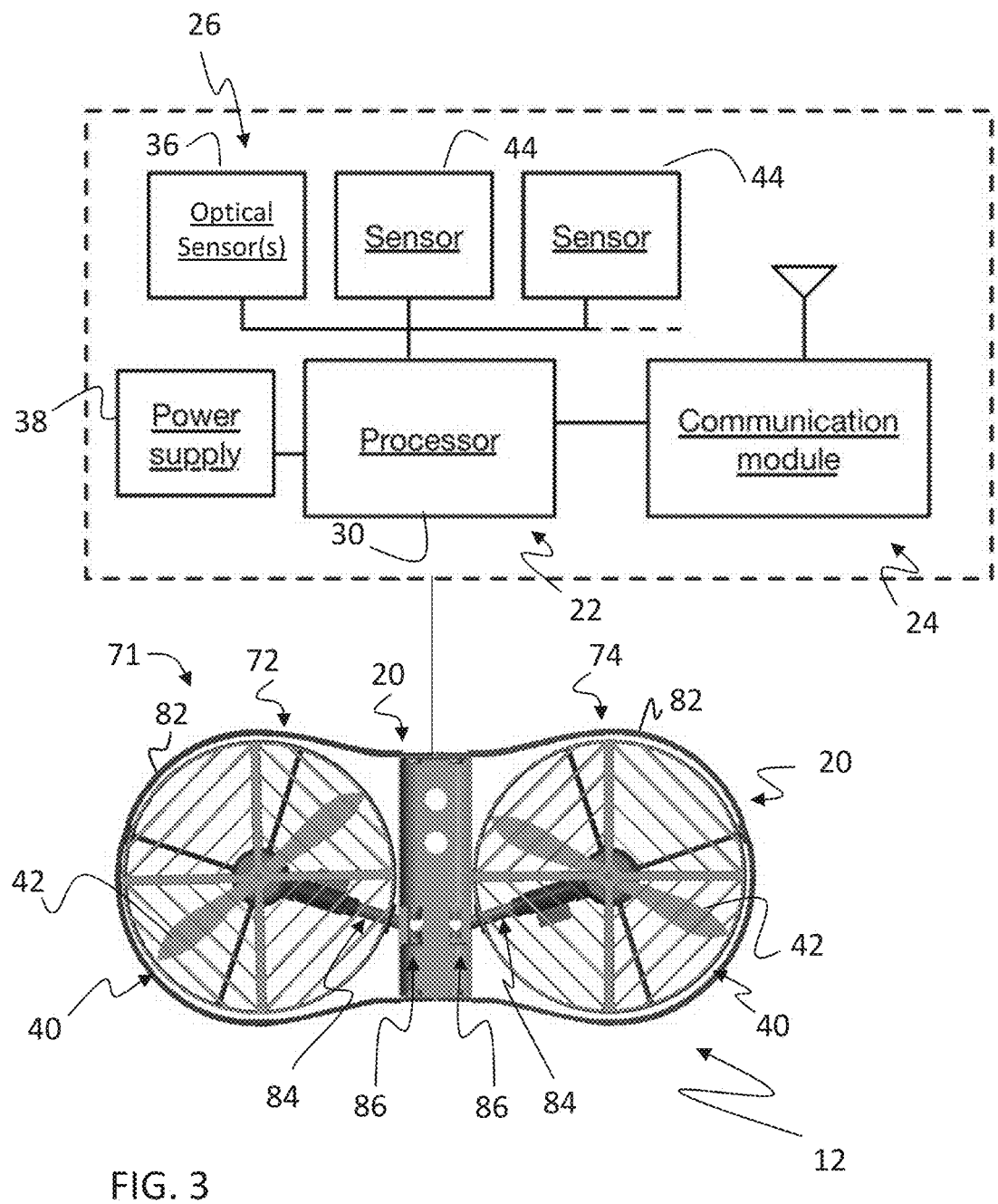
FIG. 3 is a third schematic representation of the system for controlling the aerial system and the aerial system according to an embodiment of the present invention.
Figure 4:
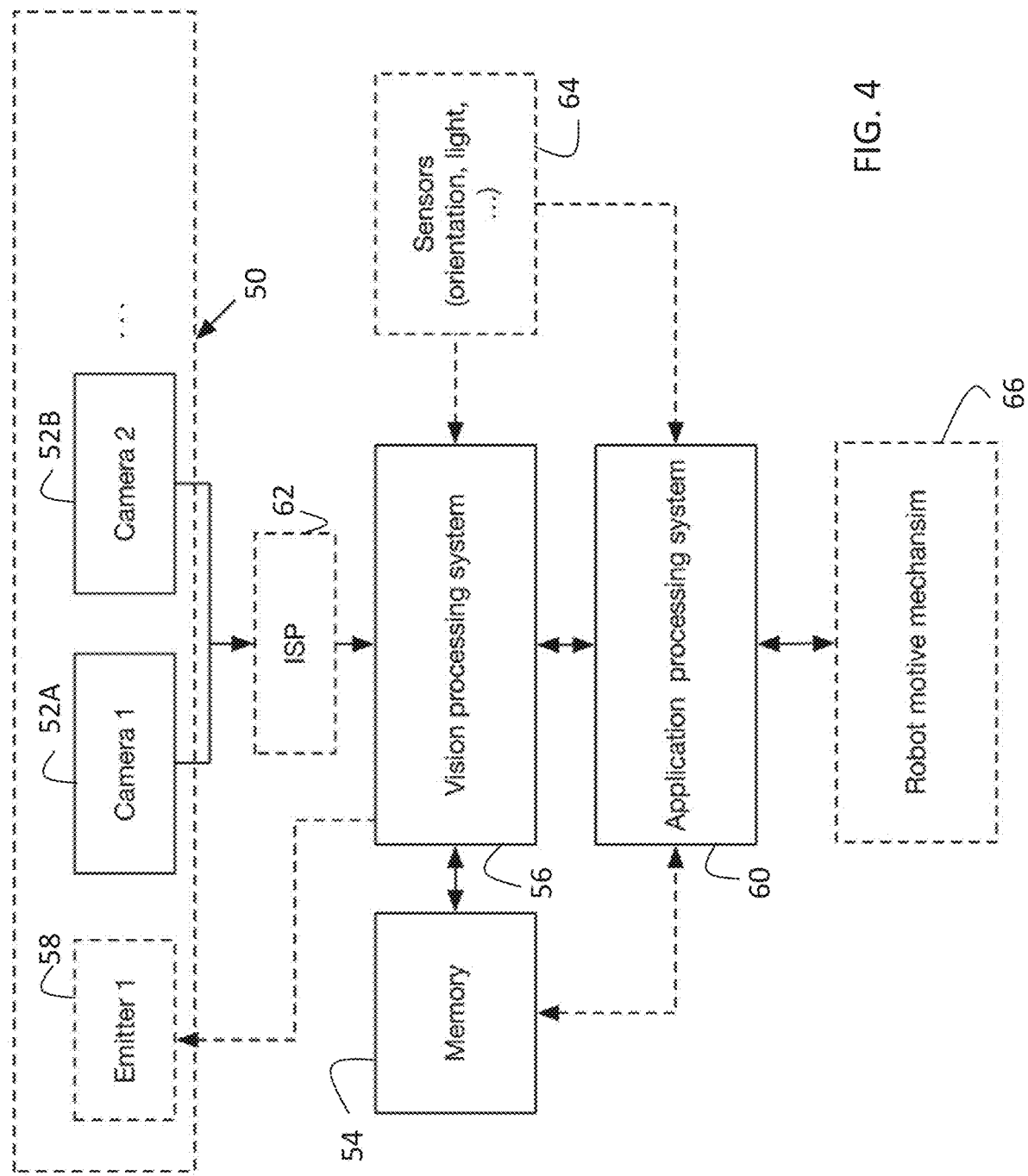
FIG. 4 is a schematic representation of an aerial system including an obstacle detection and avoidance system, according to an embodiment of the present invention.
Figure 5:
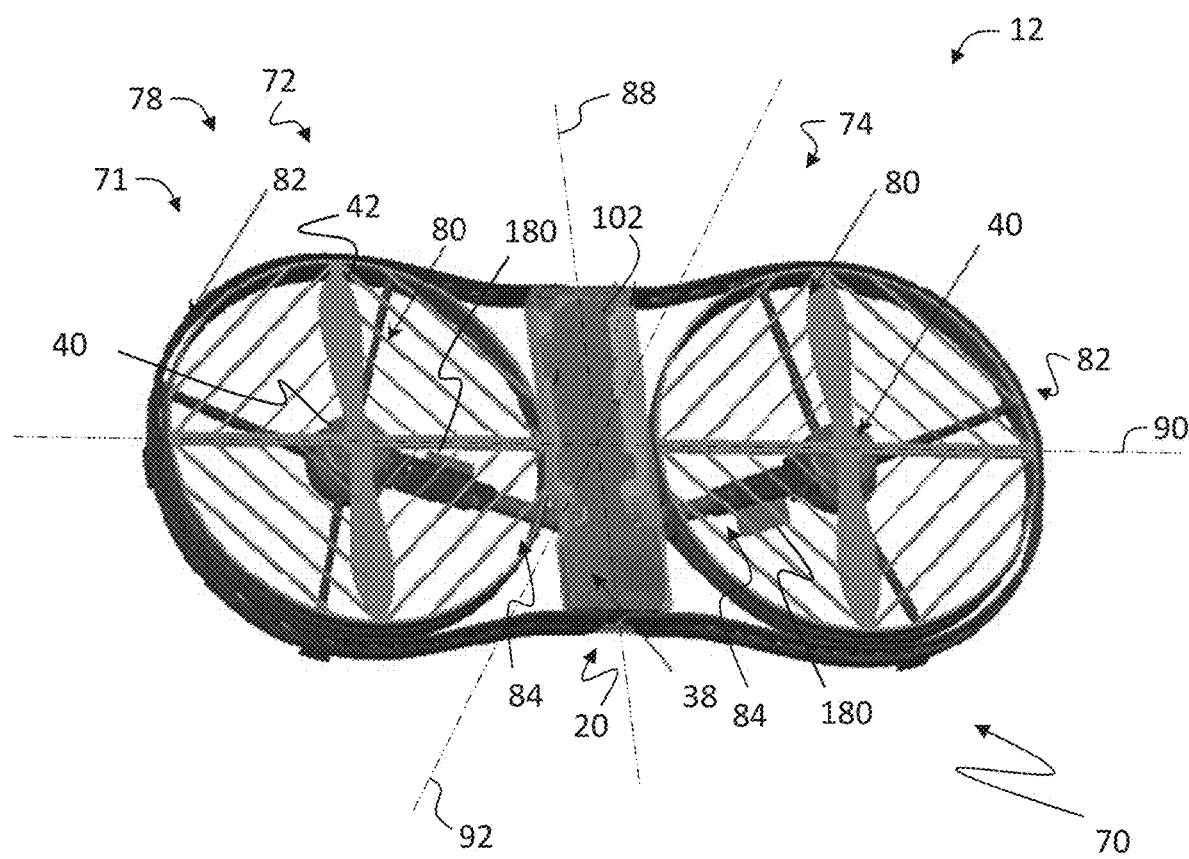
FIG. 5 is a perspective view of the aerial system shown in FIG. 1 including a frame assembly, according to an embodiment of the present invention.
Figure 6:
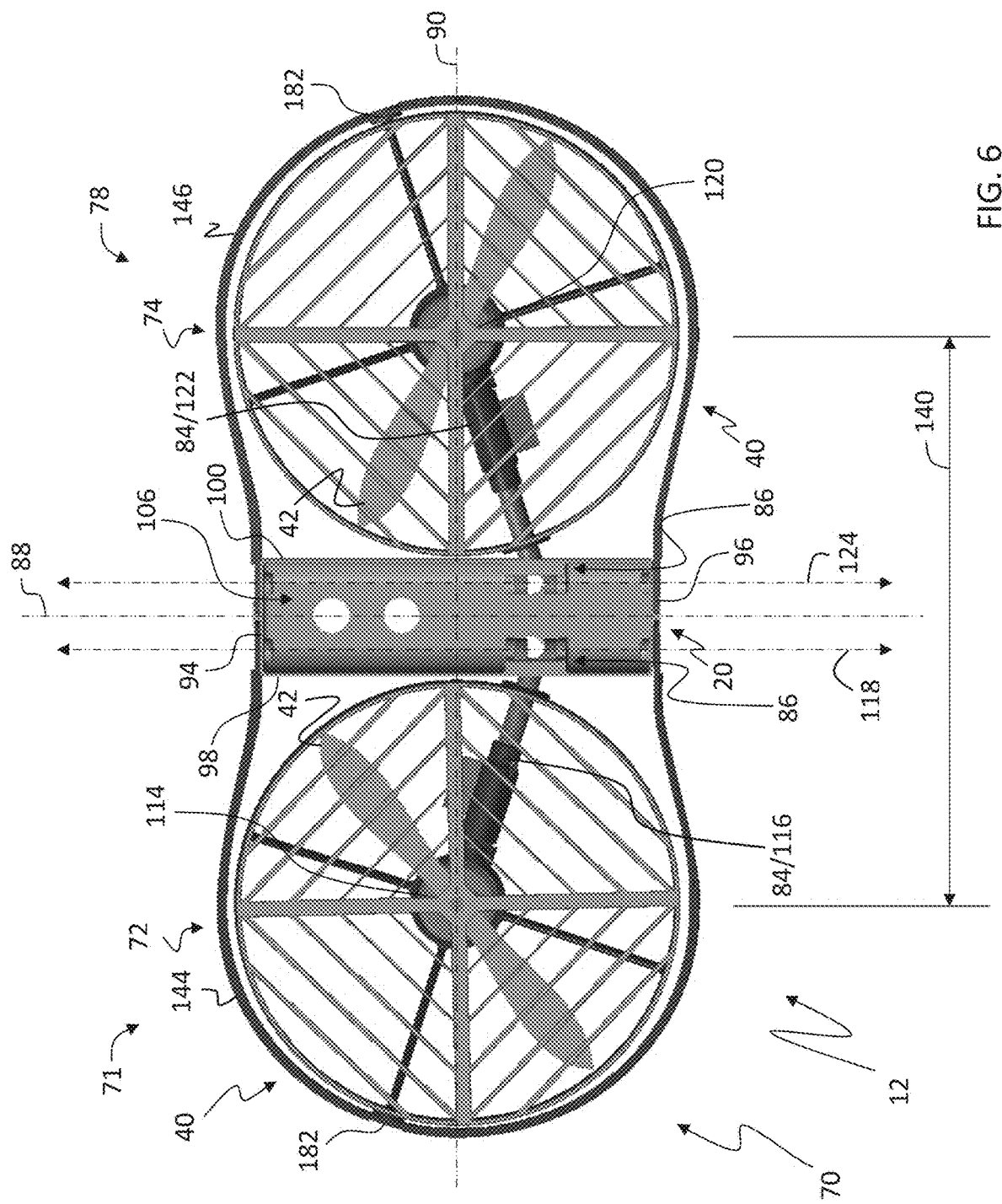
FIGS. 6-8 are top views of the aerial system shown in FIG. 5 including a lift assembly positioned in a deployed position, according to embodiments of the present invention.

As shown in FIGS. 2-4, the aerial system 12 (e.g., drone) may include a body 20, a processing system 22, a communication system 24, an optical system 26, and an actuation mechanism 28 mounting the optical system 26 to the body 20. The aerial system 12 may additionally or alternatively include one or more optical sensors 36, power supply 38, lift mechanisms 40, additional sensors 44, or any other suitable component (see below).

The body 20 of the aerial system 12 functions to support, mechanically protect, and/or retain the aerial system components. The body 20 can define a lumen, be a platform, or have any suitable configuration. The body 20 can be enclosed, open (e.g., a truss), or have any suitable construction. The body 20 can be made of metal, plastic (e.g., polymer), carbon composite, or any other suitable material. The body 20 can define a longitudinal axis, a lateral axis, a transverse axis, a front end, a back end (e.g., opposing the front end along the longitudinal axis), a top, a bottom (e.g., opposing the top along the transverse axis), or any other suitable reference. In one variation, while in flight, a transverse axis of the body 20 can be substantially parallel a gravity vector (e.g., perpendicular a ground plane) and the body's longitudinal and lateral axes can be substantially perpendicular the gravity vector (e.g., parallel the ground plane). However, the body 20 can be otherwise configured.

The body 20 may substantially encapsulate the communication system 24, power supply 38, and processing system 22, but can be otherwise configured. The body 20 can include a platform, a housing, or have any other suitable configuration. In one variation, the body 20 includes a main body housing the communication system 24, power supply 38, and a processing system 22.

The body 20 (and/or any other suitable aerial system components) can define a retention region that can be retained by a retention mechanism (e.g., a human hand, an aerial system dock, a claw, etc.). The retention region preferably surrounds a portion of one or more of the rotors, more preferably completely surrounding all of the rotors, thereby preventing any unintentional interaction between the rotors and a retention mechanism or other object near the aerial system 12. For example, a projection of the retention region onto an aerial system plane (e.g., lateral plane, rotor plane, etc.) can overlap (e.g., partially, completely, a majority of, at least 90% of, etc.) a projection of the swept area of one or more of the rotors (e.g., swept area of a rotor, total swept area of the set of rotors, etc.) onto the same aerial system plane.

The processing system 22 of the aerial system 12 functions to control aerial system operation. The processing system 22 can: stabilize the aerial system 12 during flight (e.g., selectively operate the rotors to minimize aerial system wobble in-flight); receive, interpret, and operate the aerial system 12 based on remote control instructions; and receive operation instructions from the communication system 24, interpret the operation instructions into machine instructions, and control aerial system components based on the machine instructions (individually or as a set). The processing system 22 can additionally or alternatively process the images recorded by the camera, stream images to the remote device 14 (e.g., in real- or near-real time), or perform any other suitable functionality. The processing system 22 can include one or more: processors 30 (e.g., CPU, GPU, microprocessor, etc.), memory (e.g., Flash, RAM, etc.), or any other suitable processing component. In one variation, the processing system 22 can additionally include dedicated hardware that automatically processes the images (e.g., de-warps the image, filters the image, crops the image, etc.) prior to transmission to the remote device 14. The processing system 22 is preferably connected to the active components of the aerial system 12 and mounted to the body 20, but can alternatively be otherwise related to aerial system components.

The processing system 22 is preferably configured to receive and interpret measurements sampled by the sensors 36, 44, more preferably by combining measurements sampled by disparate sensors (e.g., combining camera and accelerometer data). The aerial system 12 can include one or more processing systems, wherein different processors can perform the same functionality (e.g., function as a multi-core system), or be specialized. The processing system 22 is preferably powered by the power supply 38, but can be otherwise powered. The processing system 22 is preferably connected to and controls the sensors 36, 44, communication system 24, and lift mechanism 40, but can additionally or alternatively be connected to and interact with any other suitable component.

The communication system 24 of the aerial system functions to send and/or receive information from the remote device 14. The communication system 24 is preferably connected to the processing system 22, such that the communication system 24 sends and/or receives data form the processing system 22, but can alternatively be connected to any other suitable component. The aerial system 12 can include one or more communication systems 24 of one or more types. The communication system 24 can include wireless connections, such as radios supporting: long-range systems (e.g., Wi-Fi, cellular, WLAN, WiMAX, microwave, IR, radio frequency, etc.), short-range systems (e.g., BLE, BLE long range, NFC, ZigBee, RF, audio, optical, etc.), or any other suitable communication system 24. The communication system 24 preferably shares at least one system protocol (e.g., BLE, RF, etc.) with the remote device 14, but can alternatively communicate with the remote device 14 via an intermediary communication system (e.g., a protocol translation system). However, the communication system 24 can be otherwise configured.

The optical system 26 of the aerial system 12 functions to record images of the physical space proximal the aerial system 12. The optical system 26 is preferably mounted to the body 20 via the actuation mechanism 28, but can alternatively be statically mounted to the body 20, removably mounted to the body 20, or otherwise mounted to the body 20. The optical system 26 is preferably mounted to the front end of the body 20, but can optionally be mounted to the bottom (e.g., proximal the front), top, back end, or any other suitable portion of the body 20. The optical system 26 is preferably connected to the processing system 22, but can alternatively be connected to the communication system 24 or to any other suitable system. The optical system 26 can additionally include dedicated image processing hardware that automatically processes images recorded by the camera prior to transmission to the processor or other endpoint. The aerial system 12 can include one or more optical systems 26 of same or different type, mounted to the same or different position. In one variation, the aerial system 12 includes a first optical system 26, mounted to the front end of the body 20, and a second optical system 26, mounted to the bottom of the body 20. The first optical system 26 can actuate about a pivotal support, and the second optical system 26 can be substantially statically retained relative to the body 20, with the respective active surface substantially parallel the body bottom. The first optical system 26 can include a high-definition optical sensor 36, while the second optical system 26 can include a low definition optical sensor 36. However, the optical system or systems 26 can be otherwise configured.

The optical system 26 can include one or more optical sensors 36 (see FIG. 4). The one or more optical sensors 36 can include: a single lens camera (e.g., CCD camera, CMOS camera, etc.), a stereo-camera, a hyperspectral camera, a multispectral camera, or any other suitable image sensor. However, the optical system 26 can be any other suitable optical system 26. The optical system 26 can define one or more active surfaces that receive light, but can alternatively include any other suitable component. For example, an active surface of a camera can be an active surface of a camera sensor (e.g., CCD sensor, CMOS sensor, etc.), preferably including a regular array of sensor pixels. The camera sensor or other active surface is preferably substantially planar and rectangular (e.g., having a first sensor edge, a second sensor edge opposing the first sensor edge, and third and fourth sensor edges each perpendicular to and extending from the first sensor edge to the second sensor edge), but can alternatively have any suitable shape and/or topography. The optical sensor 36 can produce an image frame. The image frame preferably corresponds with the shape of the active surface (e.g., rectangular, having a first and second frame edge opposing each other, etc.), more preferably defining a regular array of pixel locations, each pixel location corresponding to a sensor pixel of the active surface and/or pixels of the images sampled by the optical sensor 36, but can alternatively have any suitable shape. The image frame preferably defines aspects of the images sampled by the optical sensor 36 (e.g., image dimensions, resolution, pixel size and/or shape, etc.). The optical sensor 36 can optionally include a zoom lens, digital zoom, fisheye lens, filter, or any other suitable active or passive optical adjustment. Application of the optical adjustment can be actively controlled by the controller, manually controlled by the user 18 (e.g., wherein the user manually sets the adjustment), controlled by the remote device 14, or otherwise controlled. In one variation, the optical system 26 can include a housing enclosing the remainder of the optical system components, wherein the housing is mounted to the body 20. However, the optical system 26 can be otherwise configured.

The actuation mechanism 28 of the aerial system 12 functions to actionably mount the optical system 26 to the body 20. The actuation mechanism 28 can additionally function to dampen optical sensor vibration (e.g., mechanically stabilize the resultant image), accommodate for aerial system roll, or perform any other suitable functionality. The actuation mechanism 28 can be active (e.g., controlled by the processing system), passive (e.g., controlled by a set of weights, spring elements, magnetic elements, etc.), or otherwise controlled. The actuation mechanism 28 can rotate the optical system 26 about one or more axes relative to the body, translate the optical system 26 along one or more axes relative to the body, or otherwise actuate the optical system 26. The optical sensor(s) 36 can be mounted to the support along a first end, along an optical sensor back (e.g., opposing the active surface), through the optical sensor body, or along any other suitable portion of the optical sensor 36.

In one variation, the actuation mechanism 28 can include a motor (not shown) connected to a single pivoted support (e.g., gimbal), wherein the motor pivots the support about the rotational (or gimbal) axis based on instructions received from the controller. The support is preferably arranged with the rotational axis substantially parallel the lateral axis of the body 20, but can alternatively be arranged with the rotational axis at any other suitable orientation relative to the body 20. The support is preferably arranged within a recessed cavity defined by the body 20, wherein the cavity further encompasses the optical sensor 36 but can alternatively be arranged along the body exterior or arranged at any other suitable portion of the body 20. The optical sensor 36 is preferably mounted to the support with the active surface substantially parallel the rotational axis (e.g., with the lateral axis, or axis parallel the lateral axis of the body 20, substantially parallel the rotational axis), but can alternatively be arranged with the active surface arranged at any suitable angle to the rotational axis.

The motor is preferably an electric motor, but can alternatively be any other suitable motor. Examples of electric motors that can be used include: DC motors (e.g., brushed motors), EC motors (e.g., brushless motors), induction motor, synchronous motor, magnetic motor, or any other suitable electric motor. The motor is preferably mounted to the body 20 (e.g., the body interior), electrically connected to and controlled by the processing system 22, and electrically connected to and powered by a power supply or system 38. However, the motor can be otherwise connected. The actuation mechanism 28 preferably includes a single motor-support set, but can alternatively include multiple motor-support sets, wherein auxiliary motor-support sets can be arranged orthogonal (or at any other suitable angle to) the first motor-support set.

In a second variation, the actuation mechanism 28 can include a set of pivoted supports and weights connected to the optical sensor 36 offset from the optical sensor center of gravity, wherein the actuation mechanism 28 passively stabilizes the optical sensor 36.

The power supply 38 of the aerial system 12 functions to power the active components of the aerial system 12. The power supply 38 is preferably mounted to the body 20, and electrically connected to all active components of the aerial system 12 (e.g., directly or indirectly), but can be otherwise arranged. The power supply 38 can be a primary battery, secondary battery (e.g., rechargeable battery), fuel cell, energy harvester (e.g., solar, wind, etc.), or be any other suitable power supply. Examples of secondary batteries that can be used include: a lithium chemistry (e.g., lithium ion, lithium ion polymer, etc.), nickel chemistry (e.g., NiCad, NiMH, etc.), or batteries with any other suitable chemistry.

A lift mechanism 40 of the aerial system 12 functions to enable aerial system flight. The lift mechanism 40 preferably includes a set propeller blades 42 driven by one or more motors (see below), but can alternatively include any other suitable propulsion mechanism. The lift mechanism 40 is may be mounted to the body 20 and/or aerial system 12 and controlled by the processing system 22. The aerial system 12 can include multiple lift mechanisms 40. For example, the aerial system 12 may include two or four lift mechanisms 40, wherein the lift mechanisms 40 are substantially evenly distributed about the perimeter of the aerial system 12 (e.g., wherein the lift mechanisms 40 of each pair oppose each other across the body 20). In the illustrated embodiment, the aerial system 12 includes two opposing lift mechanism 40, however, the lift mechanisms 40 can be otherwise configured.

Additional sensors 44 of the aerial system function to record signals indicative of aerial system operation, the ambient environment surrounding the aerial system 12 (e.g., the physical space proximal the aerial system 12), or any other suitable parameter. The sensors 44 are preferably mounted to the body 20 and controlled by the processing system 22, but can alternatively be mounted to any other suitable component and/or otherwise controlled. The aerial system 12 can include one or more sensors 36, 44. Examples of sensors that can be used include: orientation sensors (e.g., inertial measurement sensors, accelerometer, gyroscope, altimeter, magnetometer, etc.), ambient light sensors, temperature sensors, pressure sensors, optical sensors, acoustic sensors (e.g., transducers, microphones), voltage sensors, current sensors (e.g., Hall effect sensors), air flow meter, touch sensors (e.g., resistive, capacitive, etc.), proximity sensors, force sensors (e.g., strain gauge meter, load cell), vibration sensors, chemical sensors, sonar sensors, location sensor (e.g., GPS, GNSS, triangulation, etc.), or any other suitable sensor.

In one variation, the aerial system 12 includes a first camera mounted (e.g., statically or rotatably) along a first end of the aerial system body with a field of view intersecting the lateral plane of the body; a second camera mounted along the bottom of the aerial system body with a field of view substantially parallel the lateral plane; and a set of orientation sensors, such as an altimeter and accelerometer. However, the system can include any suitable number and arrangement of any sensor type.

The aerial system 12 can additionally include inputs (e.g., microphones, cameras, etc.), outputs (e.g., displays, speakers, light emitting elements, etc.), or any other suitable component.

The aerial system 12 can optionally be used with a remote computing system, or with any other suitable system. The aerial system 12 functions to fly, and can additionally function to take photographs, deliver loads, and/or relay wireless communications. The aerial system 12 is preferably a rotorcraft (e.g., quadcopter, helicopter, cyclocopter, etc.), but can alternatively be a fixed-wing aircraft, aerostat, or be any other suitable aerial system 12.

The remote computing system functions to receive auxiliary user inputs, and can additionally function to automatically generate control instructions for and send the control instructions to one or more aerial systems 12. Each aerial system 12 can be controlled by one or more remote computing systems. The remote computing system preferably controls the aerial system 12 through a client (e.g., a native application, browser application, etc.), but can otherwise control the aerial system 12. The remote computing system can be a user device, remote server system, connected appliance, or be any other suitable system. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a Wi-Fi module, BLE, cellular module, etc.), or any other suitable component.

The system 10 may be configured for controller-free user drone interaction. Normally, the aerial system, or drone, 12 requires a separate device, e.g., the remote device 14. The remote device 14 may be embodied in different types of devices, including, but not limited to a ground station, remote control, or mobile phone, etc. . . . In some embodiments, control of the aerial system 12 may be accomplished by the user through user expression without utilization of the remote device 14. User expression may include, but is not limited to, any action performed by the user that do not include physical interaction with the remote device 14, including thought (through brain wave measurement), facial expression (including eye movement), gesture and/or voice. In such embodiments, user instructions are received directly via the optical sensors 36 and at least some of the other sensors 44 and processed by the onboard processing system 22 to control the aerial system 12.

In at least one embodiment, the aerial system 12 may be controlled without physical interaction with the remote device 14, however, a display of the remote device 14 may be used to display images and/or video relayed from the aerial system 12 which may aid the user 18 in controlling the aerial system 12. In addition, sensors 36, 44 associated with the remote device 14, e.g., camera(s) and/or a microphone (not show) may relay data to the aerial system 12, e.g., when the aerial system 12 is too far away from the user 18. The sensor data relayed from the remote device 14 to the aerial system 12 is used in the same manner as the sensor data from the on-board sensors 36, 44 are used to control the aerial system 12 using user expression.

In this manner, the aerial system 12 may be fully controlled, from start to finish, either (1) without utilization of a remote device 14, or (2) without physical interaction with the remote device 14. Control of the aerial system 12 based on user instructions received at various on-board sensors 36, 44. It should be noted that in the following discussion, utilization of on-board sensors 36, 44 may also include utilization of corresponding or similar sensors on the remote device 14.

In general, the user 18 may utilize certain gestures and/or voice control to control take-off, landing, motion of the aerial system 12 during flight and other features, such as triggering of photo and/or video capturing. As discussed above, the aerial system 12 may provide the following features without utilization of, or processing by, a remote device 14:

Take-off and landing;
Owner recognition;
Facial recognition;

Speech recognition;

Facial expression and gesture recognition; and,

Control, e.g., motion, of the aerial system based on owner, facial, expression and gesture recognition, and speech recognition.

As detailed above, the aerial system 12 includes an optical system 26 that includes one or more optical sensor 36, such as a camera. The at least one on-board camera may be configured for live video streaming and computer vision analysis. Optionally the aerial system 12 can have at least one depth sensor (or stereo-vision pair) for multi-pixel depth sensing. Optionally the aerial system 12 can have at least one microphone on board for voice recognition and control.

In general, in order to provide full control of the aerial system 12, a plurality of user/drone interactions or activities from start to end of an aerial session are provided. The user/drone interactions, include, but are not limited to take-off and landing, owner recognition gesture recognition, facial expression recognition, and voice control.

The Frame Assembly 70

With reference to FIGS. 5-20C, an exemplary frame assembly 70 is illustrated. As briefly discussed above, in the illustrated embodiment the frame assembly 70 includes the fuselage body 20 and a lift assembly 71 that is coupled to the fuselage body 20. The lift assembly 71 includes a first rotor assembly 72 and a second rotor assembly 74. The rotor assemblies 72, 74 are moveable between a stowed position 76 (shown in FIGS. 9, 10, 19, and 20C) and a deployed position 78 (shown in FIGS. 5-8, 11-17, and 20A). In one embodiment, the body 20 forms part of the frame assembly 70 and may include a cover.

In the illustrated embodiment, the frame assembly 70 includes two rotor assemblies 72, 74. Each rotor assembly 72, 74 includes a safety grille or cage 80 for housing a respective lift mechanism 40. The frame assembly 70 may (optionally) include a respective outer protective frame 82 that extends from the body 20 and extends around an outer circumference of the respective rotor assembly 72, 74. As discussed more fully below, each rotor assembly 72, 74 includes a shaft assembly 84. The shaft assembly 84 is coupled to a respective hinge assembly 86. The hinge assembly 86 allows the respective shaft assembly 84 and the respective rotor assembly 72, 74, and outer protective frame 82 to rotate about a pivot point (see below) such that the aerial system 12 is in a folded (compact) orientation. Further, each cage 80 and corresponding rotor assembly 72, 74 rotate about an axis relative to the body 20 and outer protective frame 82. This is explained in further detail below.

In general, the cages 80 extend parallel the rotor rotational plane and are arranged along a first and second side of the body 20. The cages can function as an intermediary component between the rotating rotor 42 and a retention mechanism (e.g., retention mechanism such as a user's hand). The cage 80 can extend along a single side of the body 20 (e.g., along the bottom of the rotors, along the top of the rotors), along a first and second side of the body 20 (e.g., along the top and bottom of the rotors), encapsulate the rotors (e.g., extend along all sides of the rotors), or be otherwise configured. The cages 80 may be formed integrally with other components of the rotor assembly 72, 74, or may be a comprised of one or more separate pieces which must be assembled to form the cage 80.

The cages 80 may include one or more apertures (e.g., airflow apertures) fluidly connecting one or more of the rotors to an ambient environment, which can function to enable the flow of air and/or other suitable fluids between the ambient environment and the rotors (e.g., enabling the rotors to generate an aerodynamic force that causes the aerial system 12 to move throughout the ambient environment). The apertures can be elongated, or can have comparable length and width. The apertures can be substantially identical, or can differ from each other. The apertures are preferably small enough to prevent components of a retention mechanism (e.g., fingers of a hand) from passing through the apertures. The geometrical transparency (e.g., ratio of open area to total area) of the frame near the rotors is preferably large enough to enable aerial system flight, more preferably enabling high-performance flight maneuvering. For example, each aperture can be smaller than a threshold size (e.g., smaller than the threshold size in all dimensions, elongated slots narrower than but significantly longer than the threshold size, etc.). In a specific example, the frame has a geometrical transparency of 80-90%, and the apertures (e.g., circles, polygons such as regular hexagons, etc.) each of define a circumscribed circle with a diameter of 12-16 mm. However, the body can be otherwise configured.

With reference to FIGS. 5-20C, an exemplary frame assembly 70 is illustrated. As briefly discussed above, in the illustrated embodiment the frame assembly 70 includes the fuselage body 20 and a lift assembly 71 that is coupled to the fuselage body 20. The lift assembly 71 includes first and second rotor assemblies 72, 74. The rotor assemblies 72, 74 are moveable between a stowed position 76 and a deployed position 78.

In the illustrated embodiment, three mutually perpendicular axes 88, 90, and 92 extend through the aerial system 12, and are used to define a three-dimensional Cartesian coordinate system relative to aerial system 12. For example, a longitudinal axis 88 extends lengthwise along the fuselage body 20, a lateral axis 90 extends widthwise along the fuselage body 20 and is orientated perpendicular to the longitudinal axis 88, and a transverse axis 92 is orientated perpendicular to the longitudinal axis 88 and to the lateral axis 90. In the illustrated embodiment, the fuselage body 20 includes a first endwall 94, an opposite second endwall 96, and a pair of opposing sidewalls 98, 100 extending between the first endwall 94 and the second endwall 96 along a longitudinal axis 88. The pair of opposing sidewalls 98, 100, includes a first sidewall 98 and a second sidewall 100 that is spaced a distance apart from the first sidewall 98 measured along the lateral axis 90 that is perpendicular to the longitudinal axis 88. The fuselage body 20 also includes a top plate 102. A fuselage midpoint 104 of the top plate 102 is defined along the longitudinal axis 88 between the first endwall 94 and the second endwall 96. Each of the endwalls 94, 96 and the sidewalls 98, 100 extend outwardly from the top plate 102 along the transverse axis 92 and include an inner surface that defines a cavity 106 therebetween. The cavity 106 is sized and shaped to house various components of the aerial system 12 including, but not limited to, the processor system 22, communication system 24, power supply 38, and/or sensors 36, 44. In one embodiment, the center-of-gravity of the aerial system 12 is located at the fuselage midpoint 104. In other embodiments, the center-of-gravity of the aerial system 12 is located at a position other than the fuselage midpoint 104.

In the illustrated embodiment, the lift assembly 71 includes the first rotor assembly 72 extending outwardly from the first sidewall 98 and the second rotor assembly 74 extending outwardly from the second sidewall 100. Each rotor assembly 72, 74 includes a lift mechanism 40 that is coupled to a shaft assembly 84. Each shaft assembly 84 extends between a distal end 108 and a proximal end 110 along a shaft assembly centerline axis 112. The distal end 108 is coupled to the lift mechanism 40 and the proximal end 110 that is pivotably coupled to fuselage body 20. The shaft assembly 84 is pivotably coupled to the fuselage body 20 to enable the respective rotor assembly 72, 74 to pivot with respect to the fuselage body 20 to move between the deployed position 78 and the stowed position 76

The first rotor assembly 72 includes a first lift mechanism 114 and a first shaft assembly 116 that is coupled between the first lift mechanism 114 and the fuselage body 20 for supporting the first lift mechanism 114 from the fuselage body 20. The first shaft assembly 116 is pivotably coupled to the first sidewall 98 such that the first rotor assembly 72 is pivotable about a first pivot axis 118 that is parallel to the longitudinal axis 88. The first rotor assembly 72 is configured to pivot about the first pivot axis 118 to move between the deployed position 78 and the stowed position 76. In the illustrated embodiment, the proximal end 110 of the first shaft assembly 116 is coupled to the first sidewall 98 via a respective hinge assembly 86 that allows the first rotor assembly 72 to rotate about a first pivot axis 118.

The second rotor assembly 74 includes a second lift mechanism 120 and a second shaft assembly 122 that is coupled between the second lift mechanism 120 and the fuselage body 20 for supporting the second lift mechanism 120 from the fuselage body 20. The second shaft assembly 122 is pivotably coupled to the second sidewall 100 such that the second rotor assembly 74 is pivotable about a second pivot axis 124 that is parallel to the longitudinal axis 88. The second rotor assembly 74 is configured to pivot about the second pivot axis 124 to move between the deployed position 78 and the stowed position 76. The proximal end 110 of the second shaft assembly 122 is coupled to the second sidewall 100 via a respective hinge assembly 86 that allows the second rotor assembly 74 to rotate about a second pivot axis 124. In one embodiment, each hinge assembly 86 includes a positioning assembly 126 (shown in FIG. 12) to facilitate maintaining the position of a respective rotor assembly 72, 74 in the deployed position 78. For example, in one embodiment, the positioning assembly 126 may include a pin inserted through the hinge assembly 86 to lock the respective rotor assemblies 72, 74 in the deployed position 78 and/or the stowed position 76. In other embodiments, the positioning assembly 126 may include a detent and groove arrangement to facilitate positioning the rotor assembly 72, 74 in the deployed position 78 and the stowed position 76.

Each lift mechanism 40 includes a propeller assembly 128 (shown in FIGS. 12-15) coupled to a support base 130. The propeller assembly 128 includes a plurality of rotors 42. The motor 132 rotates the rotors 42 about a propeller rotational axis 134. The motor 132 is coupled to the support base 130, and the support base 130 is coupled to the shaft assembly 84 for supporting the motor 132 and propeller assembly 128 from the shaft assembly 84.

In the illustrated embodiment, the first lift mechanism 114 includes a first propeller assembly 128 that includes a first set of rotors 42 that is rotatable about a first propeller rotational axis 136. Similarly, the second lift mechanism 120 includes a second propeller assembly 128 that includes a second set of rotor 42 that is rotatable about a second propeller rotational axis 138.

Figure 9:
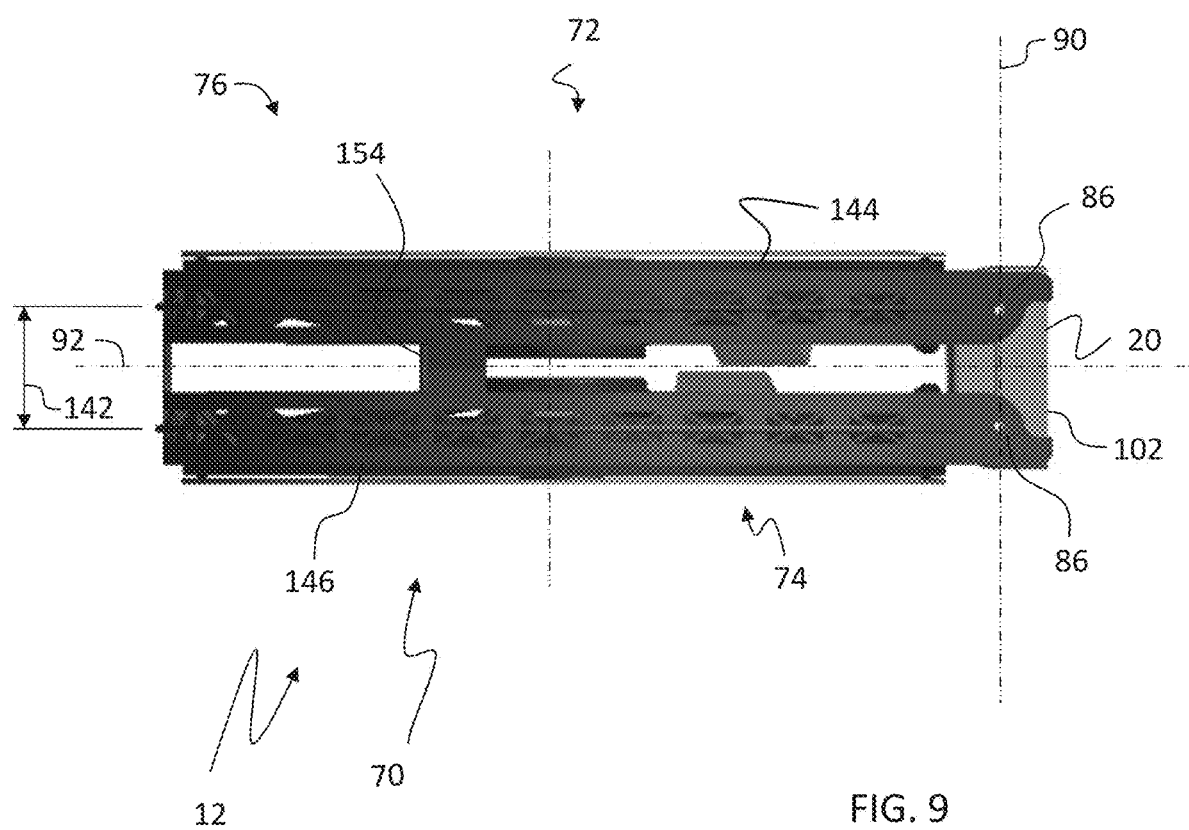
FIG. 9 is a side view of the aerial system shown in FIG. 5 including the lift assembly positioned in a stowed position.
Figure 10:
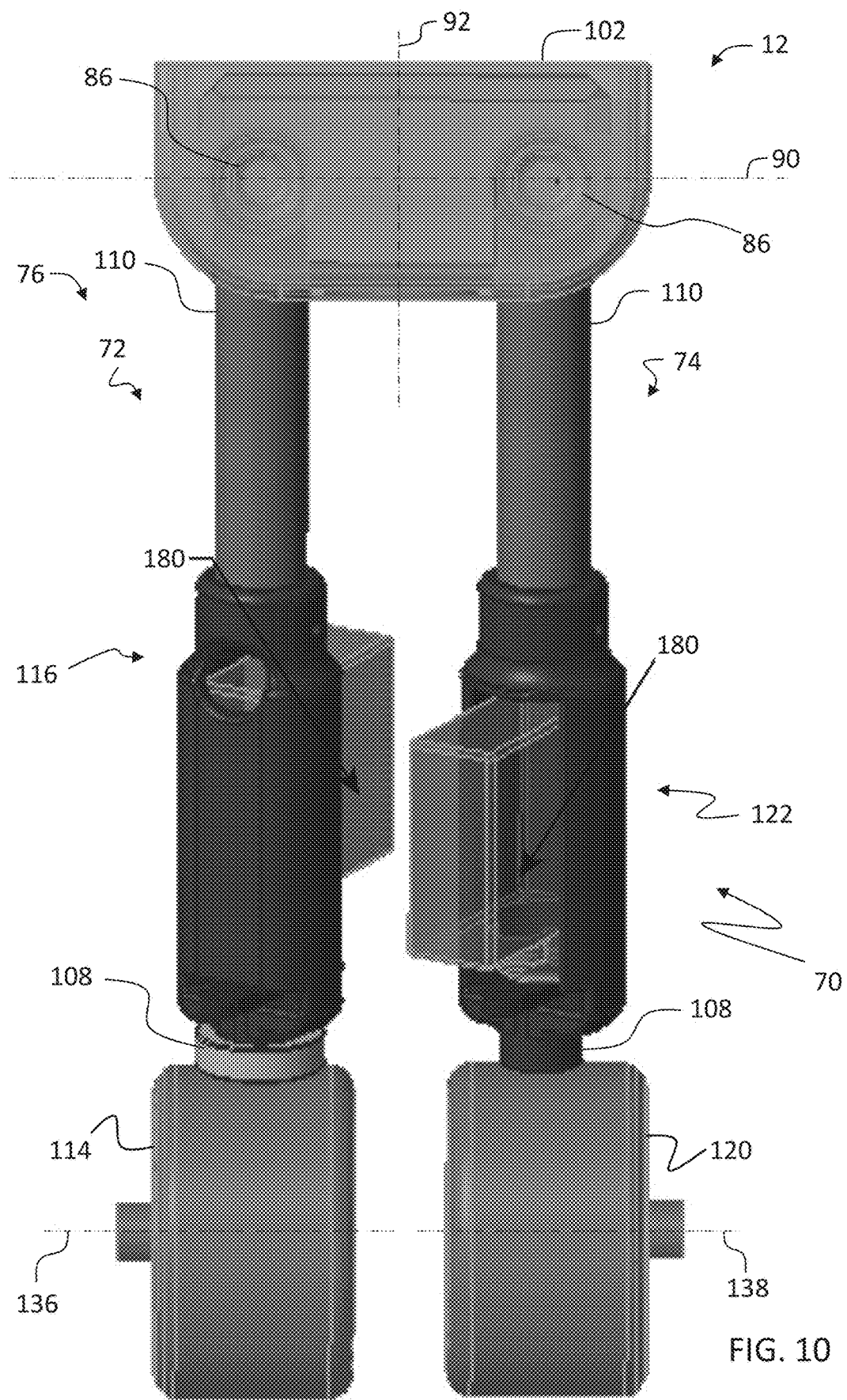
FIG. 10 is a schematic view of a portion of the aerial system shown in FIG. 9 with the lift assembly positioned in the stowed position.

When the lift assembly 71 is positioned in the deployed position 78, each rotor assembly 72 and 74 extends outwardly from the fuselage body 20 along the lateral axis 90. In the deployed position 78, the first lift mechanism 114 is spaced a first distance 140 from the second lift mechanism 120 measured along the lateral axis 90 (shown in FIG. 6). When the lift assembly 71 is positioned in the stowed position 76, the rotor assemblies 72, 74 are pivoted about the respective pivot axes 118, 124 and extend outwardly from the fuselage body 20 along the transverse axis 92. For example, as shown in FIGS. 9-10, each shaft assembly 116 and 122 is orientated along the transverse axis 92 and is substantially perpendicular to the top plate 102 of the fuselage body 20. In addition, in the stowed position 76, the rotor assemblies 72 and 74 are folded towards each other such that the first lift mechanism 114 is positioned closer to the second lift mechanism 120 and spaced a second distance 142 (shown in FIG. 9) from the second lift mechanism 120 that is less than the first distance 140. In addition, when the lift assembly 71 is positioned in the stowed position 76, the first propeller assembly 128 is orientated coaxially with the second propeller assembly 128. For example, as shown in FIG. 10, with the lift assembly 71 in the stowed position 76, the first lift mechanism 114 is orientated with respect to the second lift mechanism 120 such that the first propeller rotational axis 136 is coaxial with the second propeller rotational axis 138.

Figure 7:
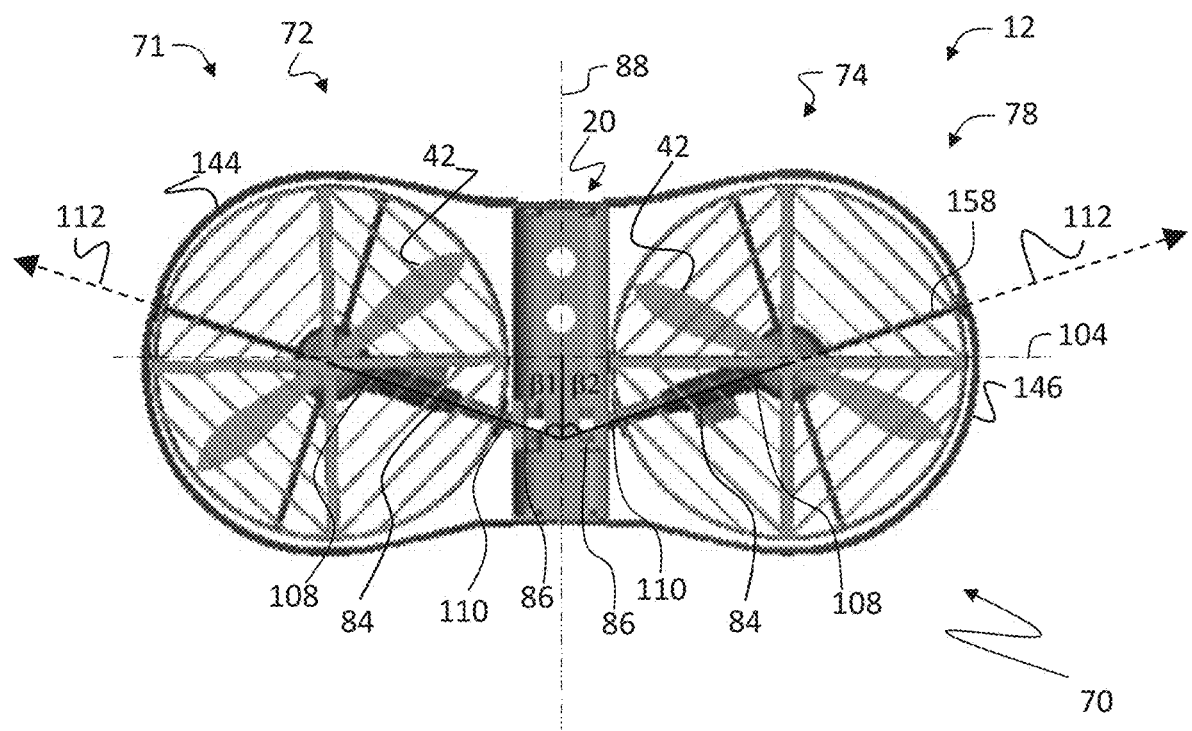

In the illustrated embodiment, the shaft assemblies 78 extend away from the body 20 at an angle other than 90 degrees from an axis of the body 20. As shown, in the illustrated embodiment, the shaft assembly 78 on the left side extends from the body 20 at an oblique angle of β1 from a centerline of the body 20 and the opposite shaft assembly 78 extends from the body 20 at an oblique angle of β2 from the centerline of the body. For example, in the deployed position 78, each shaft assembly 116, 122 extends outwardly from the fuselage body 20 at an oblique angle. As shown in FIG. 7, the first shaft assembly 116 extends outwardly from the first sidewall 98 at a first oblique angle β1 measured from the longitudinal axis 88, and the second shaft assembly 122 extends outwardly from the second sidewall 100 at a second oblique angle β2 measured from the longitudinal axis 88. In the illustrated embodiment, the first oblique angle β1 is substantially similar to the second oblique angle (32. In another embodiment, the first oblique angle β1 may be different than the second oblique angle β2. For example, in one embodiment, the shaft assemblies 78 extend away from the body 20. In one embodiment, the shaft assemblies 78 extend away from the body 20 at an angle of 90 degrees from an axis of the body 20, e.g., a centerline or the hinge axis 82A, 82B.

As shown in FIG. 7, the proximal end 110 of the first shaft assembly 116 is coupled to the first sidewall 98 at a position that is closer to the second endwall 96 than to the first endwall 94. For example, as shown in FIG. 7, the proximal end 110 of the first shaft assembly 116 is orientated between the fuselage midpoint 104 of the fuselage body 20 and the second endwall 96. In addition, in one embodiment, the first shaft assembly 116 has a length defined along the shaft centerline axis 112 such that the first lift mechanism 114 is orientated along a axis that intersects the fuselage midpoint 104 with the first rotor assembly 72 in the deployed position 78.

In the illustrated embodiment, the first rotor assembly 72 is in a mirrored relationship with the second rotor assembly 74 along the longitudinal axis 88. For example, as shown in FIG. 7, similar to the first shaft assembly 116, the proximal end 110 of the second shaft assembly 122 is coupled to the second sidewall 100 at a position that is closer to the second endwall 96 than to the first endwall 94. In addition, the proximal end 110 of the second shaft assembly 122 is orientated between the fuselage midpoint 104 and the second endwall 96. Moreover, the second shaft assembly 122 has a length defined along the shaft centerline axis 112 such that the second lift mechanism 120 is orientated along an axis that intersects the fuselage midpoint 104 with the second rotor assembly 74 in the deployed position 78. In one embodiment, the proximal end 110 of the second shaft assembly 122 may be positioned between the fuselage midpoint 104 and the first endwall 94.

Figure 8:
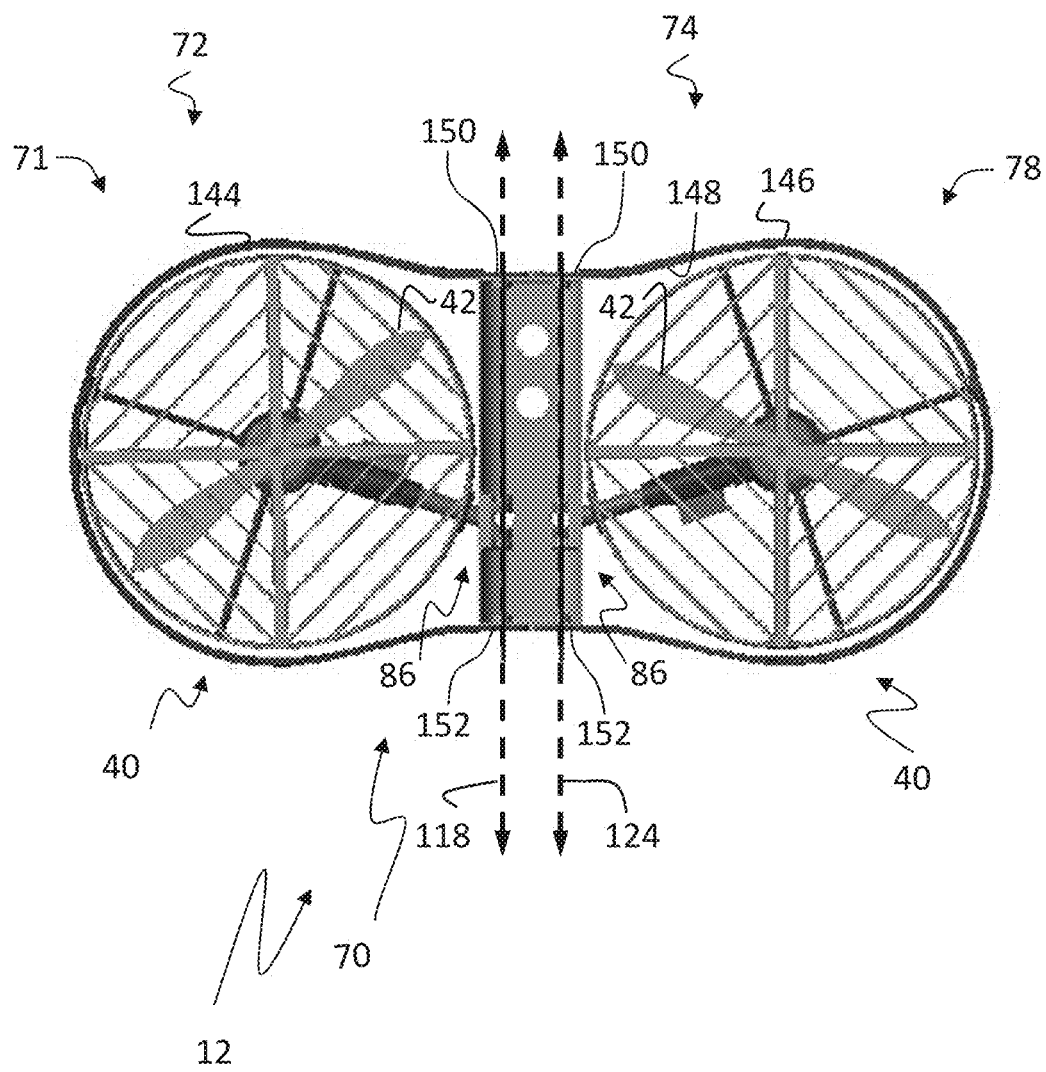

Referring to FIG. 8, the lift assembly 71 includes a first outer protective frame 144 that extends about a perimeter of the first lift mechanism 114, and a second outer protective frame 146 that extends about a perimeter of the second lift mechanism 120. Each of the first and second outer protective frames 144 and 146 is positionable at the deployed position 78 and the stowed position 76, and includes an arcuate inner surface 148 that extends between a first frame end 150 and a second frame end 152. Each first frame end 150 is pivotably coupled to the first endwall 94 and each second frame end 152 is pivotably coupled to the second endwall 96. In the illustrated embodiment, the first outer protective frame 144 is pivotable about the first pivot axis 118, and the second outer protective frame is pivotable about the second pivot axis 124. In one embodiment, each first and second frame ends 150, 152 includes a hinge assembly 86 and a positioning assembly 126 to facilitate maintaining the position of the respective first and second outer protective frames 144, 146 in the deployed position 78 and the stowed position 76. In addition, the first outer protective frame 144 and the second outer protective frame 146 may each include a locking clip 154 (shown in FIG. 9) that extends outwardly from the respective outer protective frames 144, 146. Each locking clip 154 is configured to interlock with a corresponding locking clip 154 to facilitate securing the lift assembly 71 in the stowed position 76 (shown in FIG. 9).

Figure 12:
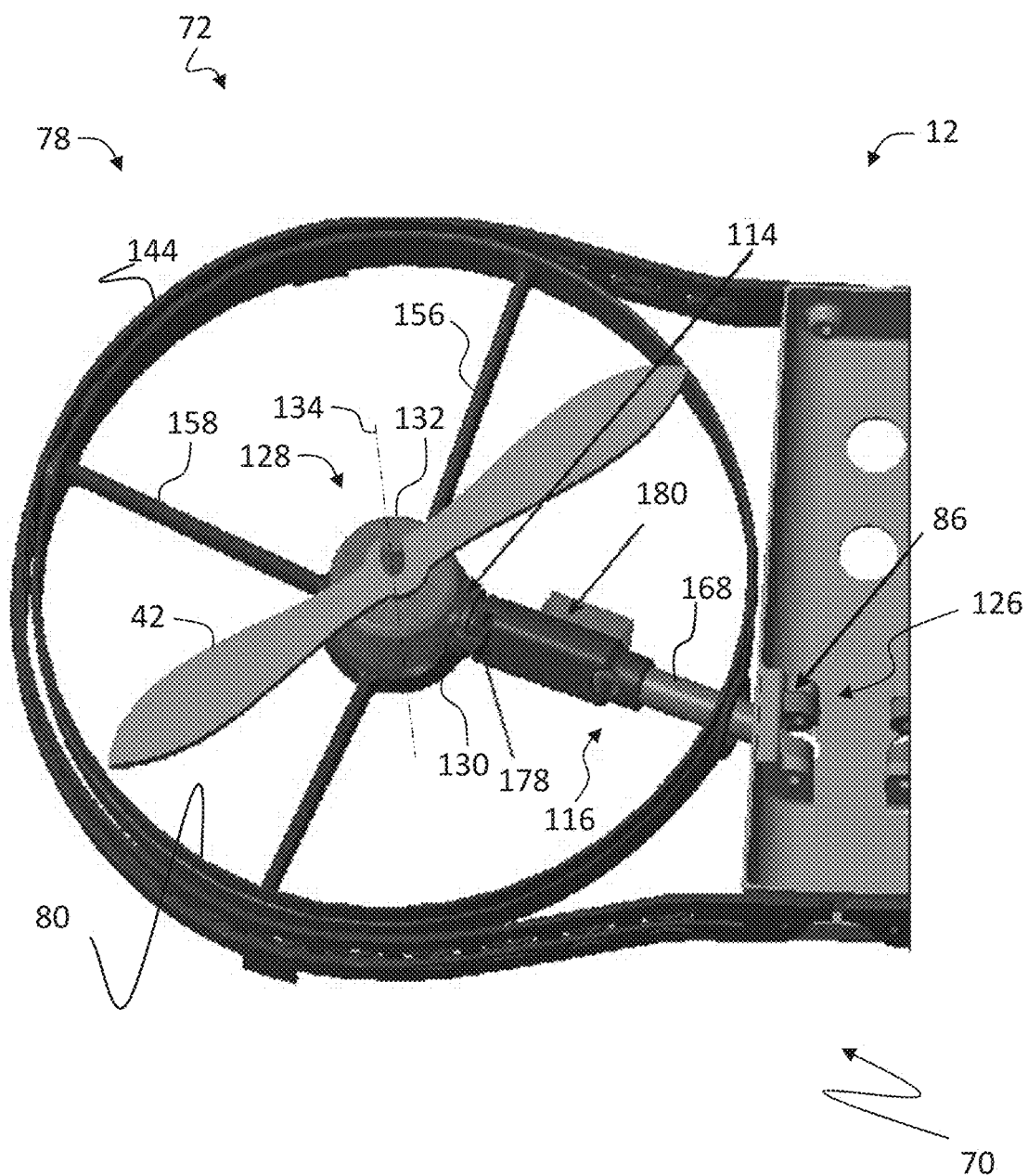
FIG. 12 is a perspective view of a portion of the lift assembly shown in FIG. 5, including a rotor assembly, according to an embodiment of the present invention.

Each rotor assembly 72, 74 includes a plurality of support struts 156 that are coupled between the lift mechanism 40 and the respective outer protective frames 144, 146. In the illustrated embodiment, one or more of the support struts 156 is coupled to a bottom portion of the lift mechanism 40 and extends radially outwardly from an outer surface of the lift mechanism 40 at an oblique angle to the respective outer protective frame 144, 146. For example, as shown in FIG. 12, in one embodiment, each support strut 156 is coupled to the support base 130 of the lift mechanism 40, and extends outwardly from the support base 130 to the respective outer protective frame 144, 146 at the oblique angle. In addition, in the deployed position 78, a top surface of the lift mechanism 40 is orientated in a planar relationship with the top plate 102 of the top plate 102 of the fuselage body 20 such that the top plate 102 and the top surface of the lift mechanism 40 are orientated along the a plane defined by the intersection of the longitudinal axis 88 and the lateral axis 90.

With reference to FIG. 12, in the illustrated embodiment, each rotor assembly 72, 74 includes a primary support strut 158 that is coupled between the lift mechanism 40 and the respective outer protective frame 144, 146, and is orientated along the shaft assembly centerline axis 112. The primary support strut 158 is rotatably coupled to the respective outer protective frame 144, 146 such that the lift mechanism 40 is rotatable with respect to the respective outer protective frame 144, 146 about the shaft assembly centerline axis 112.

Referring to FIGS. 16-20C, in one embodiment, the lift assembly 71 does not include the first and the second outer protective frames 144, 146, and/or the plurality of struts 156. In this embodiment, each shaft assembly 116, 122 is coupled to the fuselage body 20 via a swivel assembly 160 and the hinge assembly 86 to enable the respective shaft assemblies 116, 122 to pivot about the respective pivot axes 118, 124, and to rotate about a swivel rotational axis 162 that is perpendicular to the longitudinal axis 88. For example, the proximal end 110 of the first shaft assembly 116 is rotatably coupled to the first sidewall 98 such that the first rotor assembly 72 is rotatable with respect to the fuselage body 20 about the swivel rotational axis 162 that is parallel to the lateral axis 90. Similarly, the proximal end 110 of the second shaft assembly 122 is rotatably coupled to the second sidewall 100 such that the second rotor assembly 74 is rotatable with respect to the fuselage body 20 about the swivel rotational axis 162.

In one embodiment, the swivel assembly 160 includes a support member 164 that is coupled to the hinge assembly 86 and is inserted into a corresponding cavity 166 defined within the fuselage body 20. The cavity 166 is sized and shaped to receive the support member 164 therein and to allow the support member 164 to rotate about the swivel axis 162.

Figure 20A:
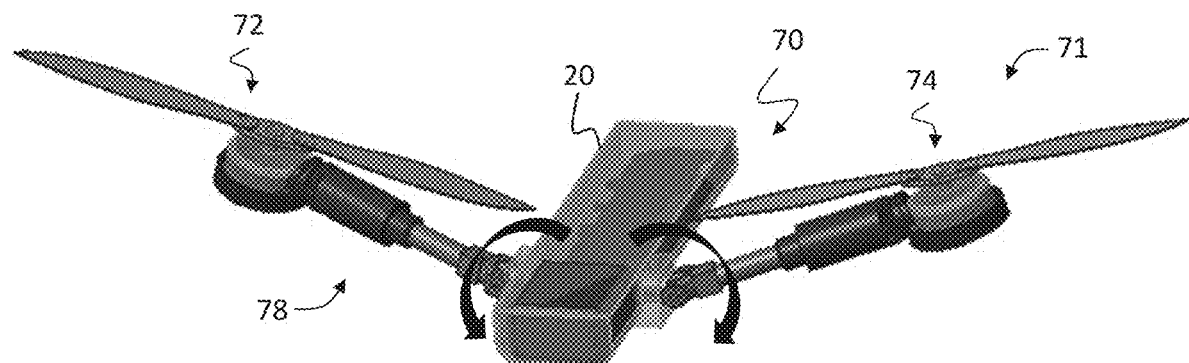
FIGS. 20A-20C are schematic illustrations of a transition of the lift assembly shown in FIG. 16 from the deployed position to the stowed position.
Figure 20B:
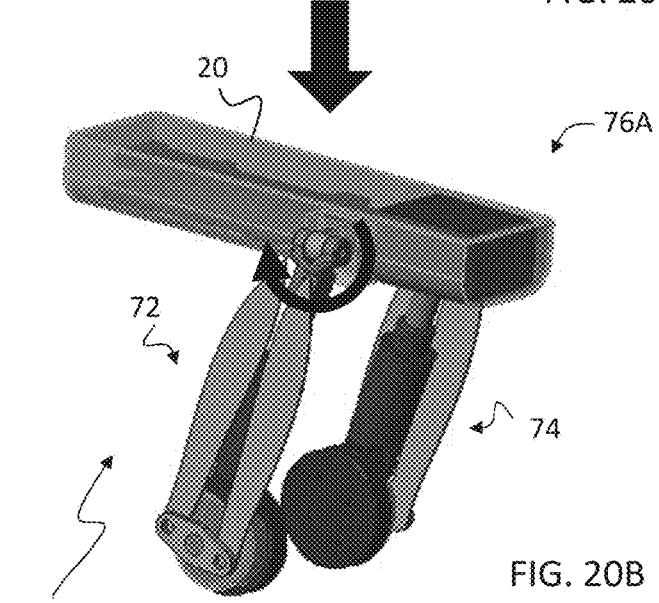
Figure 20C:
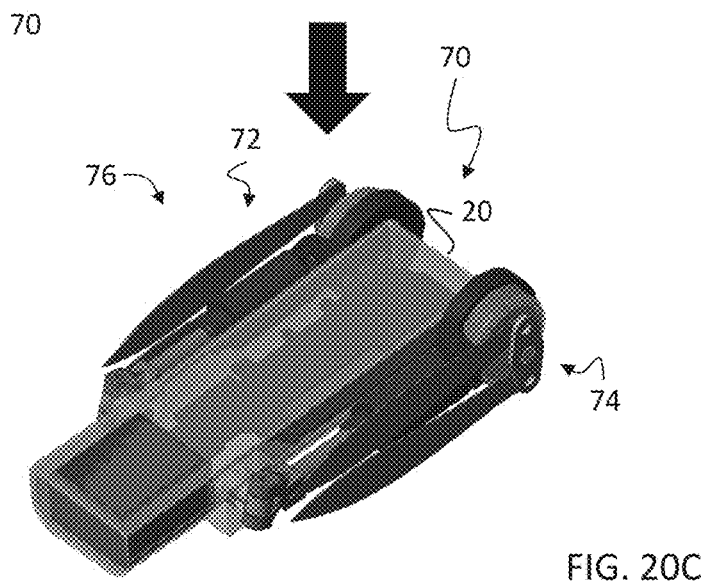

In addition, the swivel assembly 160 may include the positioning assembly 126 including a detent and groove arrangement to facilitate positioning the rotor assembly 72, 74 in the deployed position 78 and the stowed position 76. For example, as shown in FIGS. 20A-20C, when being positioned from the deployed position 78 to the stowed position 76, the first and the second rotor assemblies 72, 74 are pivoted along the respective pivot axis 118, 124, to an intermediate stowed position 76A in which the first lift mechanism 114 is orientated coaxially with the second lift mechanism 120. Then the first and second rotor assemblies 72, 74, are rotated about the swivel axis 162 to the stowed position 76 in which the first shaft assembly 116 and the second shaft assembly 122 are orientated parallel to the longitudinal axis 88, respectively, and the first lift mechanism 114 and the second lift mechanism 120 are positioned adjacent to the fuselage body 20. In addition, each of the rotor 42 may be folded to a position parallel to the longitudinal axis 88.

Figure 17:
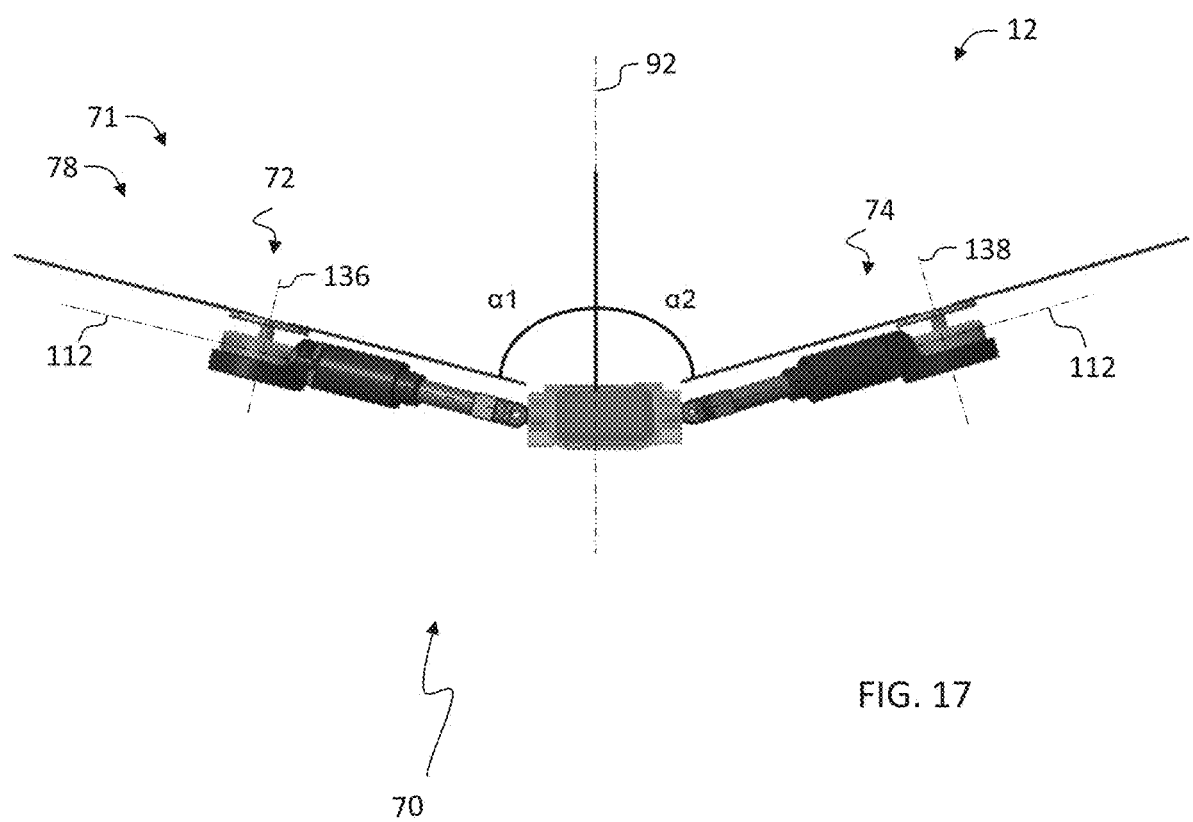
FIG. 17 is an elevation plan view of the aerial system shown in FIG. 16 including the lift assembly in the deployed position.
Figure 18:
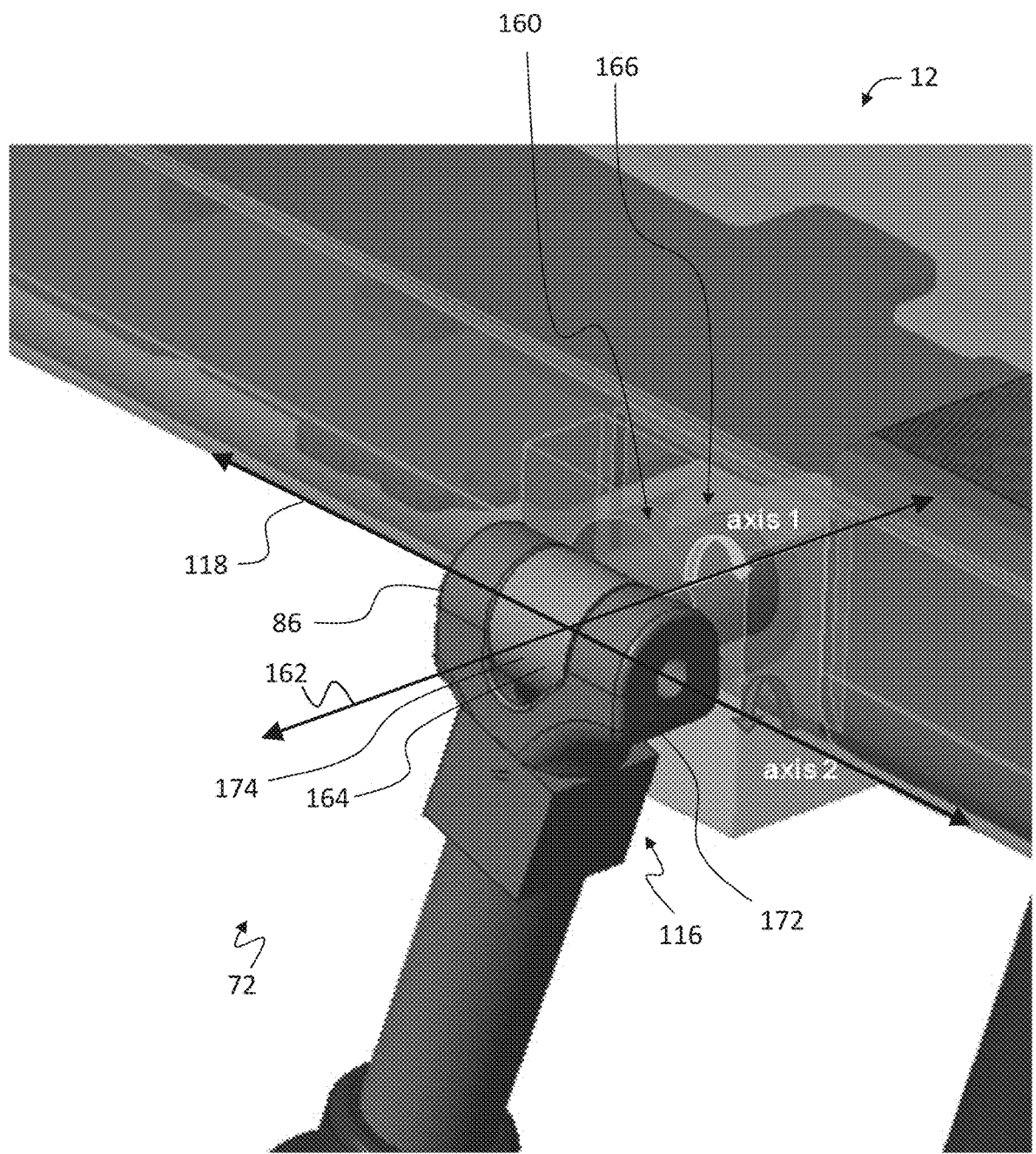
FIG. 18 is a schematic view of a portion of the lift assembly shown in FIG. 16, according to an embodiment of the present invention.
Figure 19:
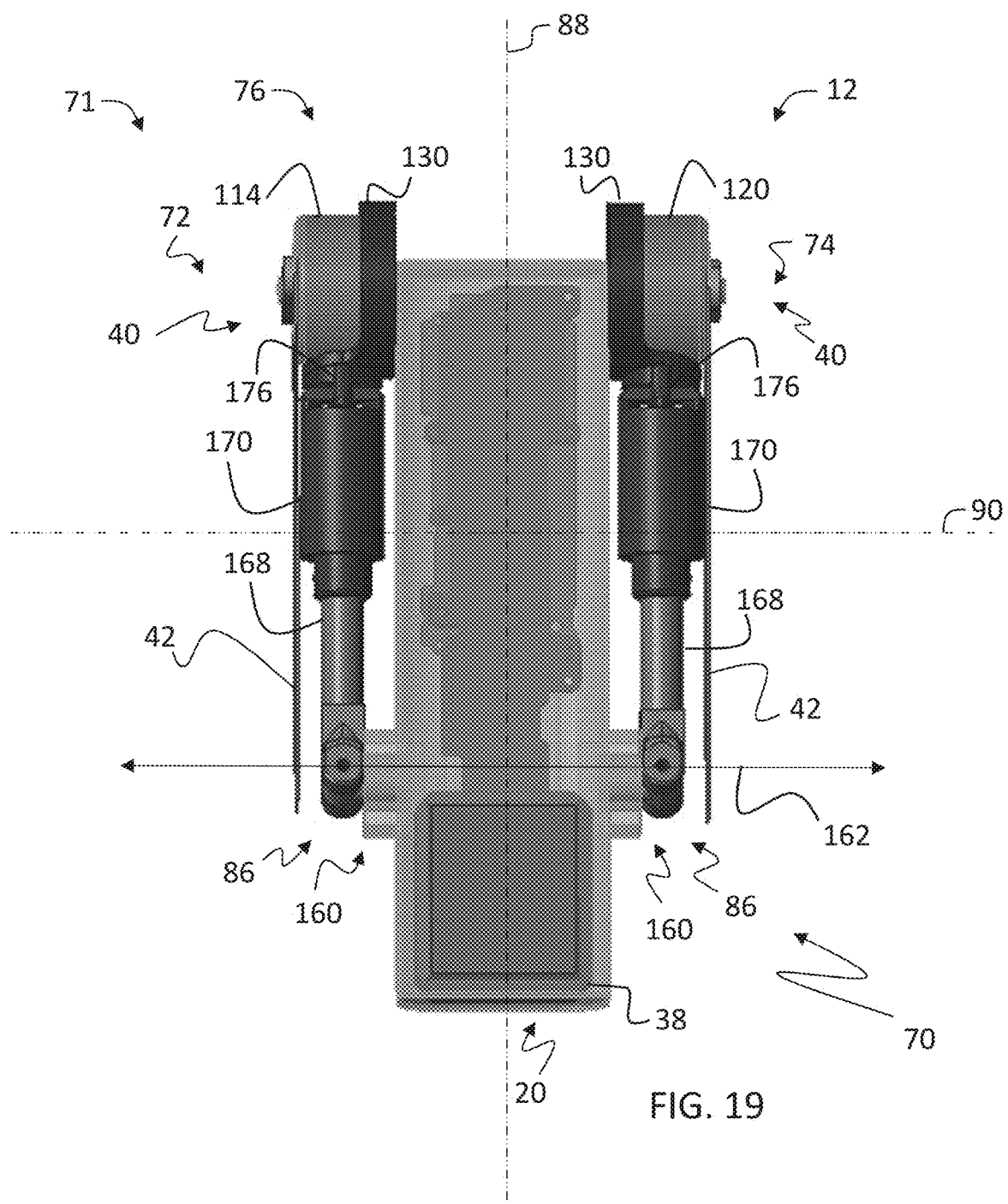
FIG. 19 is a top view of the aerial system shown in FIG. 16 including the lift assembly in the stowed position, according to an embodiment of the present invention.

In one embodiment, as shown in FIG. 17, the first rotor assembly 72 and the second rotor assembly 74 are orientated at oblique angles with respect to the lateral axis 90 with the lift assembly 71 in the deployed position 78. For example, in the deployed position 78, the first propeller assembly 128 is orientated at a first oblique angle $\alpha_1$ measured with respect to the lateral axis 90, and the second propeller assembly 128 are orientated at a second oblique angle $\alpha 2$ measured with respect to the lateral axis 90. In the illustrated embodiment, the first and second oblique angles $\alpha 1$ and $\alpha 2$ are substantially equal. In other embodiments, the first and second oblique angles $\alpha 1$ and $\alpha 2$ are different.

The frame assembly 70 in FIG. 5-19 may be used with a multitude of different types of aerial systems 12. The frame assembly 70 of the present invention may be used with aerial systems designed for, but not limited to, the following functions: selfie pictures and/or video, remote control aerial surveillance, autonomous flying robot(s), etc.

Figure 13:
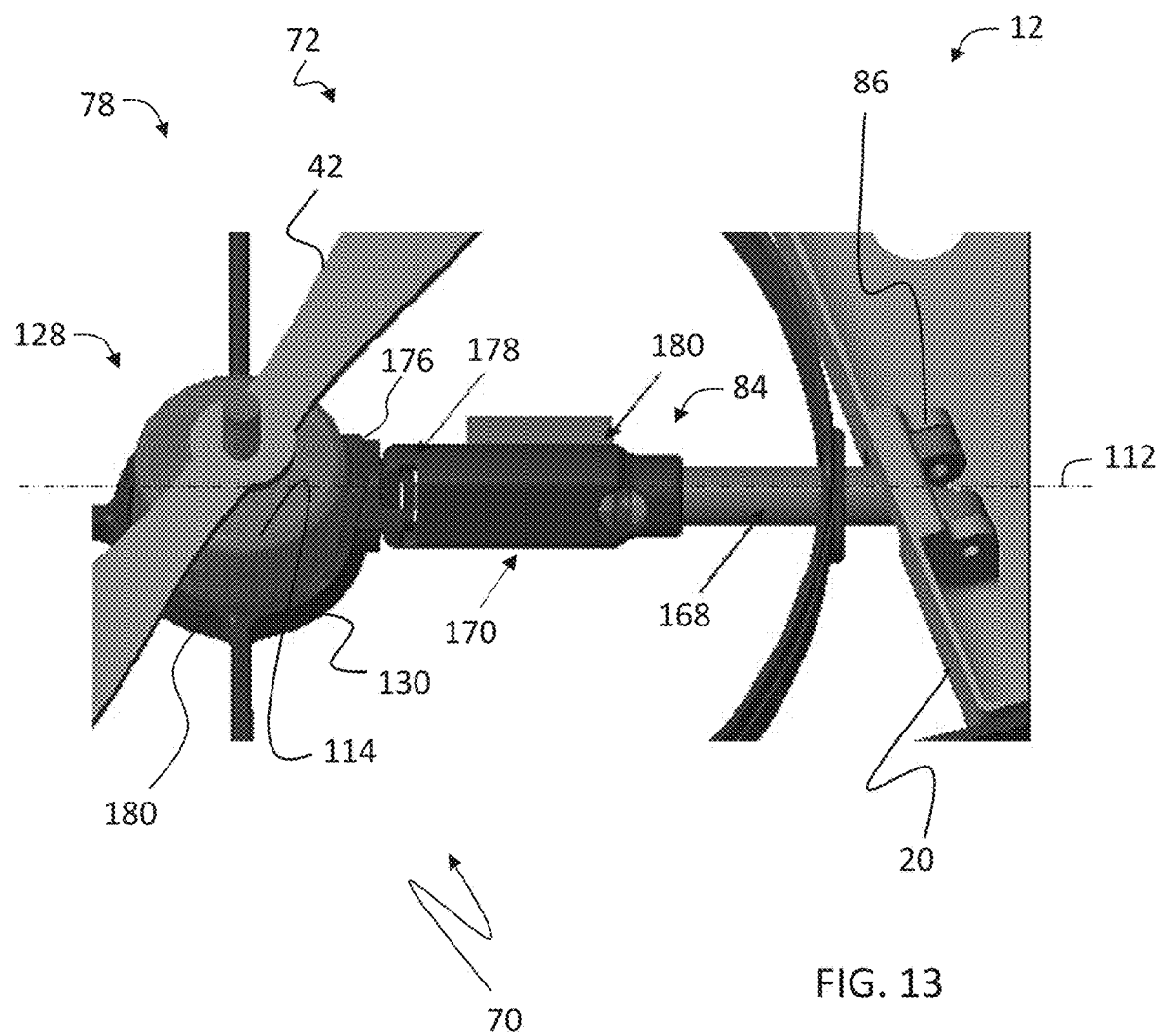
FIGS. 13-15 are various views of the rotor assembly shown in FIG. 5.
Figure 14:
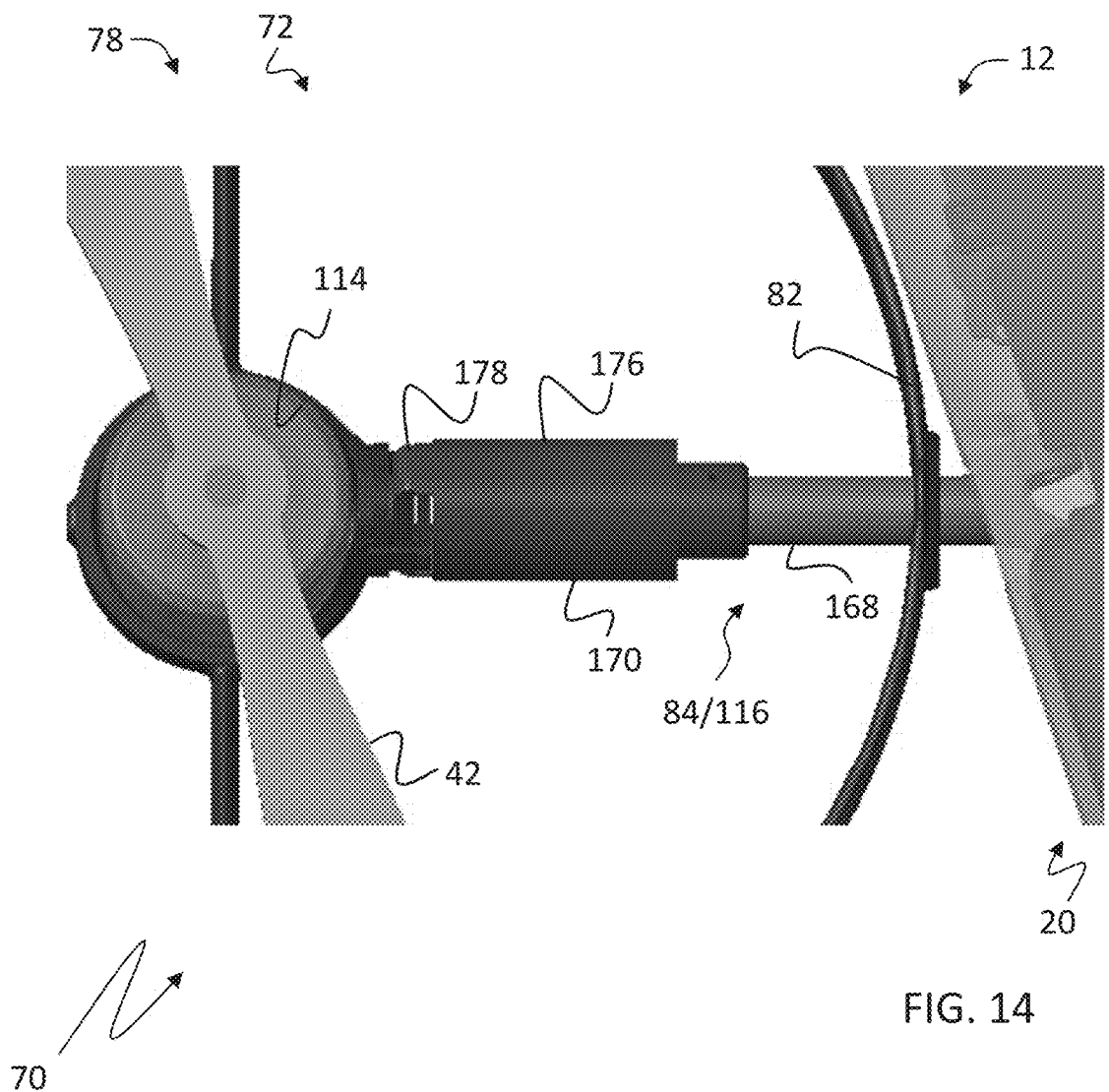
Figure 15:
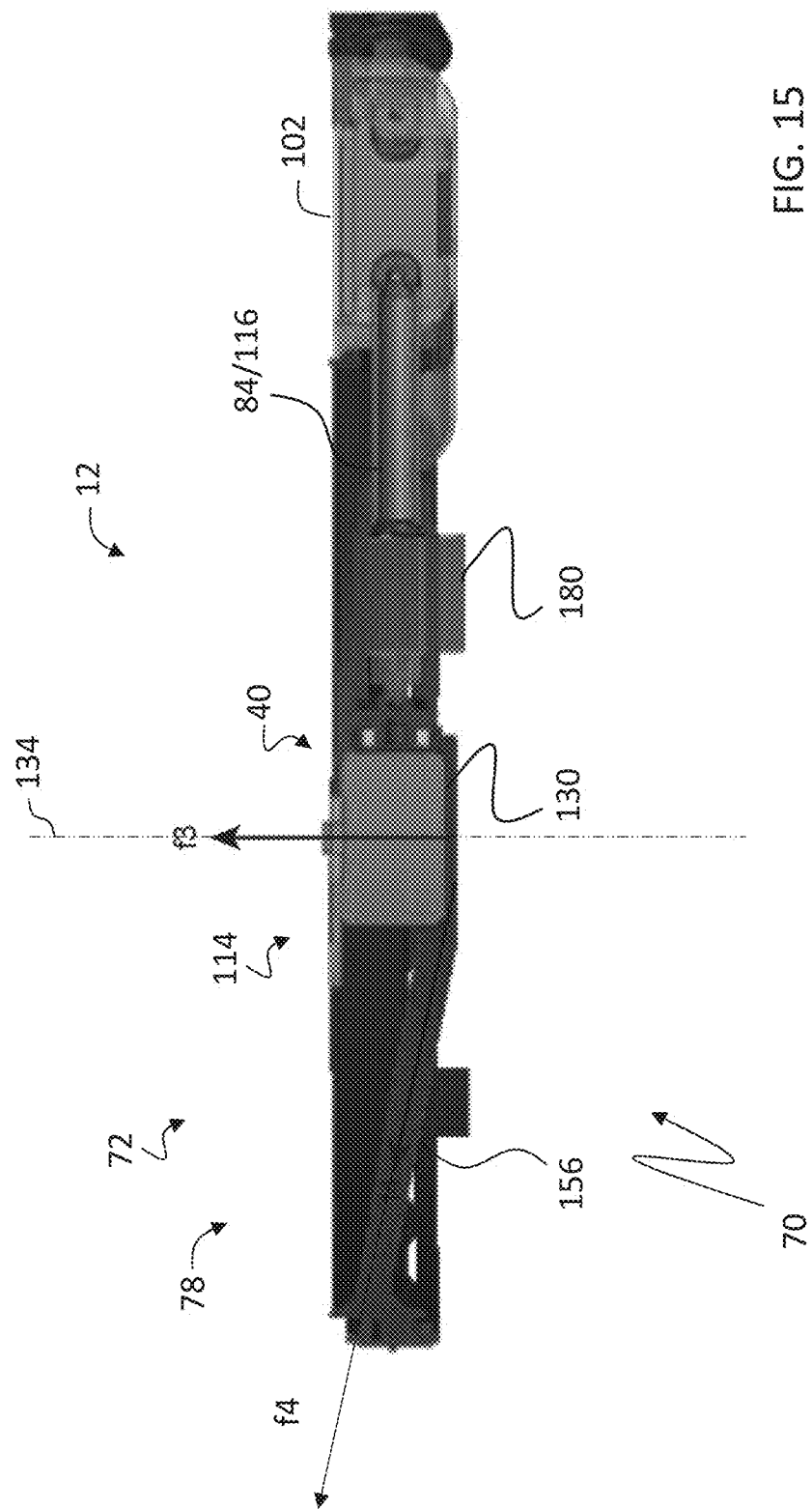
Figure 16:
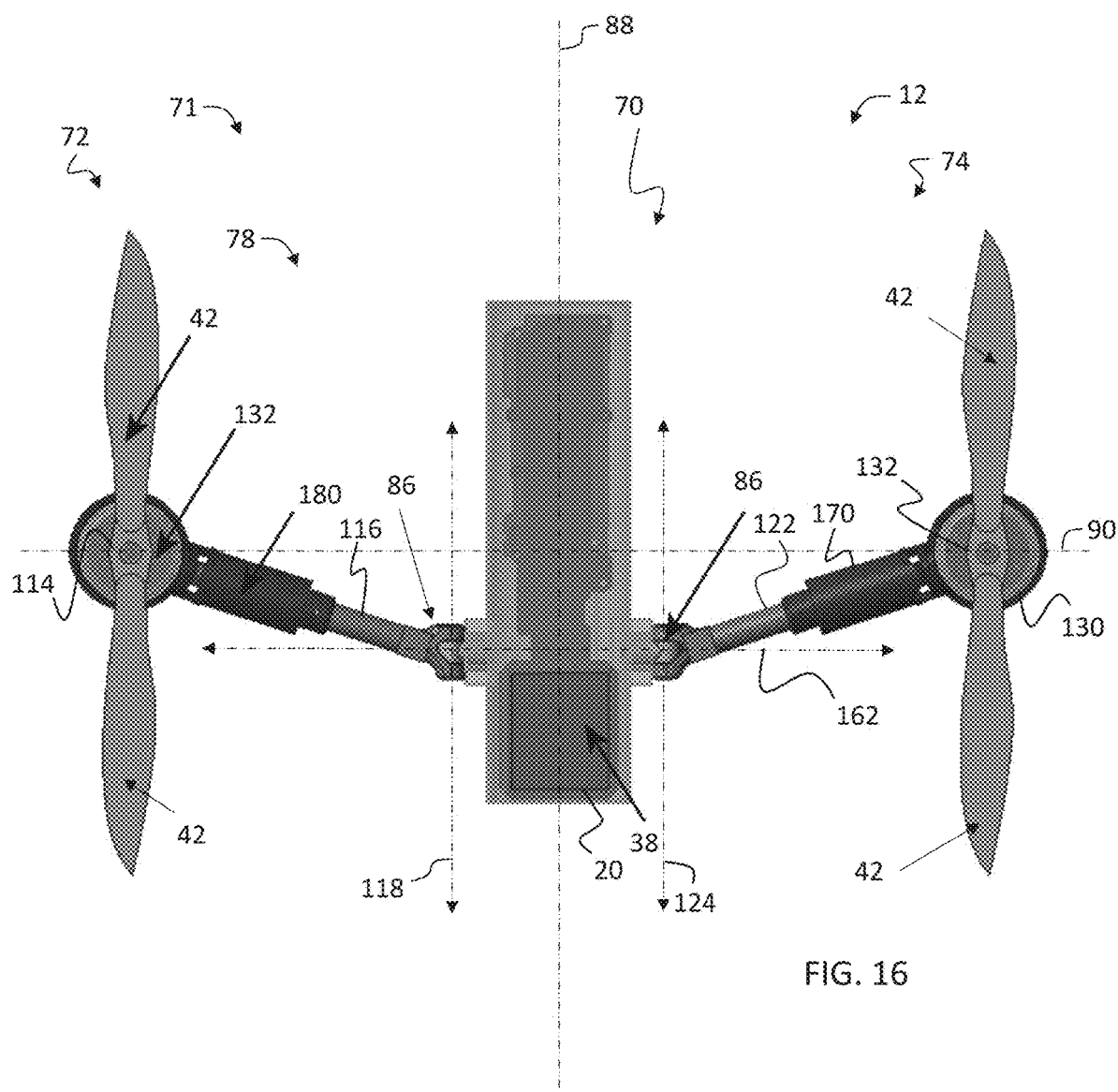
FIG. 16 is a top view of the aerial system shown in FIG. 1 including a lift assembly in the deployed position, according to an embodiment of the present invention.

With reference to FIGS. 13-15, each shaft assembly 84 includes a lower shaft 168 and an upper shaft 170. One end of the lower shaft 168 is fixedly coupled to the upper shaft 170. The opposite end of lower shaft 168 forms a part of the respective hinge assembly 86. In the illustrated embodiment, the lower shaft 168 includes two cylinders 172 that form part of the respective hinge assembly 86. The body 20 includes a third cylinder 174. In use, the two cylinders 172 and third cylinder 174 are interleaved and coupled via a pivot or pin to form the respective hinge assembly 86.

As shown, the body 20 forms a cavity within which are housed the power supply (in the form of a battery) 38 and a PC board on which sensors and other components of the system 10 or aerial system 12 may be mounted.

Each rotor assembly 72, 74 may further include a rotor assembly base 176 that is coupled to support base 130. The rotor assembly base 176 may be rotatably coupled to the upper shaft 170 and include a lag 178 that fits within a slot of the upper shaft 170. A servo motor or rotary actuator 180 is mounted to the upper shaft 170 and is coupled to the rotor assembly base 176. In one embodiment, the rotor assembly base 176 includes the support base 130 and the plurality of spindles 156 that extend from the support base 130 to an outer protective frame. The cage 80 may include one or more cage components that are affixed to the rotor assembly base 176.

A rotor motor 132 is mounted to the support base 130. One of the propeller blades or rotors 42 is mounted to the rotor motor 132. Under control of the processing system 22, the rotor assembly base 176, rotor motor 132 and rotor 42 may be rotated along a shaft axis 112. The motion of the rotor assembly base 176 may be limited by the lag 178 and slot in the upper shaft 170.

As discussed above, the body 20 may form part of the frame assembly 70. In the illustrated embodiment, the frame assembly 70 includes the first and second rotor assemblies 72, 74 which include a cage 80 for housing a respective rotor 42. The cage 80 provides protection to, and from, the rotors 42, while allowing proper airflow. As discussed above, when not in use, the rotor assemblies 72, 74 may be pivoted about a respective hinge axis 118, 124 such that the aerial system 12 is in a closed or compact arrangement.

Figure 21:
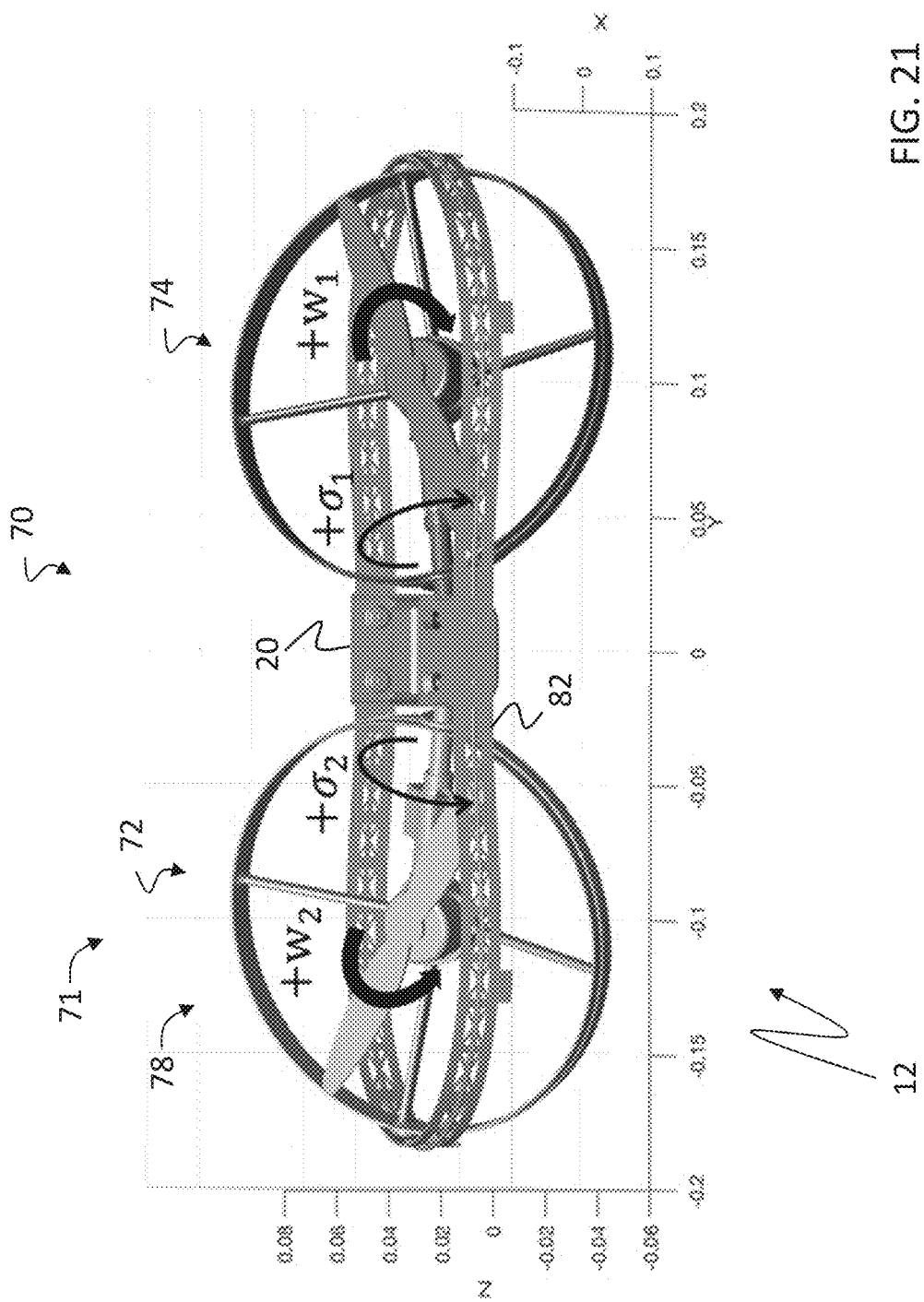
FIGS. 21-24 are schematic representations of a frame assembly of an aerial system during different maneuvers, according to an embodiment of the present invention.

As shown in FIG. 21, the rotary motors 132, under control of the processors 22, control the rotational position of the rotor assemblies 72, 74 relative to the body 20 to control direction of movement, pitch and roll of the aerial system 12. The rotor assemblies may be rotated in about the respective shaft axis 112 in two directions. As shown in FIG. 21, the rotor assemblies 72, 74 may be rotated (in either direction) from a plane defined by the body 20 and the outer protective frame 82. A pivot 182 may be provided between the rotor assembly 72, 74 and the respective outer protective frames 144, 146 to allow relative movement. The pivot 182 may include a bearing to minimize friction between the rotor assembly 72, 74 and the outer protective frames 144, 146.

Figure 11:
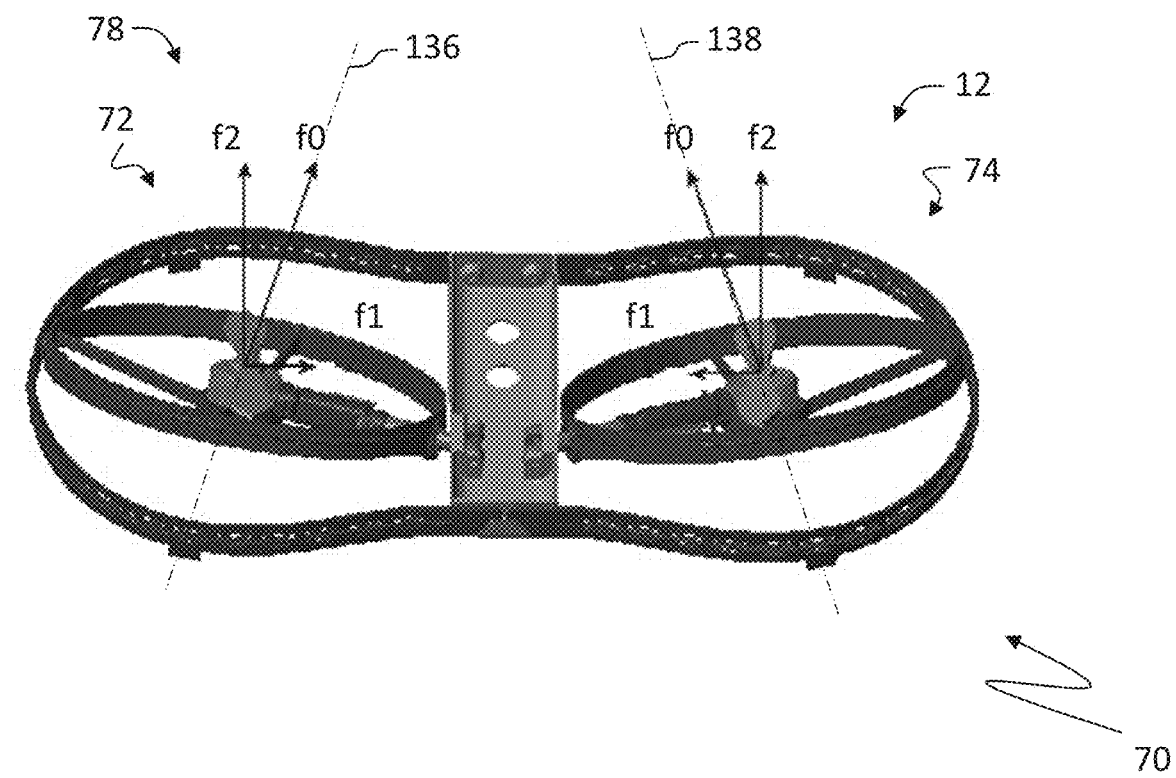
FIG. 11 is another perspective view of the aerial system shown in FIG. 5 with the lift assembly in the deployed position.

With reference to FIGS. 11 and 21, utilizing an angle other than 90 degrees between the shaft axis 112 and the centerline or hinge axis provides certain benefits. First, when the aerial system 12 is in motion, the body 20 may produce a force, f1, in the direction of the center of gravity of the aerial system 12. This force, f1, may act to improve the stability of the aerial system 12. For instance, when the aerial system 12 is required to pitch or move forward, the rotation of the servo motor along the shaft axis may produce a gyroscopic effect that steadies the aerial system 12 against adversary aerodynamic torques. Additionally, this arrangement minimizes the forces transmitted through the shaft assemblies 116, 122 to the body 20, thus making, the aerial system 12 more stable. For instance, then a lateral gust of wind is present, the force component in the lateral direction, which is a result of the tilted rotary assembly 72, 74 along the shaft axis 112, produces more control authority to fight against the wind effects. Further, this arrangement allows for a more compact size of the aerial system 12 when the rotor assemblies 72, 74 are in the stowed position 76. Since the shaft assemblies 116, 122 do not occupy the clustered middle position of the frame assembly 70, the location of the other components may be arranged spatially efficiently. For instance, as shown in FIG. 10, in one embodiment the servo motors 180 have a roughly rectangular shape that extends from the respective upper shaft 170. The servo motors 180 may be arranged in a complimentary manner (as shown) to allow a more compact shape when the aerial system 12 is not being flown. When the rotor assemblies 72, 74 are in the deployed position 78, the servo motors 180 are at an angle relative to a horizontal plane of the body 20. This reduces the windward surface when the aerial system 12 is in flight.

As discussed above, the frame assembly 70 may (optionally) include a respective outer protective frame 82 that extends from the body 20 and extends around an outer circumference of the respective rotor assembly 72, 74. In the illustrated embodiment, the outer protective frames 144, 146 have a semi-elliptical shape. However, the shape of the outer protective frames 144, 146 may have a different shape dependent upon the number and arrangement of the rotor assemblies 72, 74. As discussed more fully below, each rotor assembly 72, 74 includes a shaft assembly 84. The shaft assembly 84 is coupled to a respective hinge assembly 86. The hinge assembly 86 allows the respective shaft assembly 84 and the respective rotor assembly 72, 74, rotor 42 and outer protective frames 144, 146 to rotate about a pivot point (see below) such that the system 10 is in a folded (compact) orientation.

With specific reference to FIGS. 5-15, in a first embodiment of the present invention, each rotor assembly 72, 74 has an associated outer protective frame 82. When the aerial system 12 is not in use, the hinge assemblies 86 allow the rotor assemblies 72, 74 and the outer protective frames 144, 146 to rotate about the respective hinge axis 118, 124.

As shown in FIGS. 16-19, in a second embodiment of the present invention in which an outer protective frame and cages are not utilized, collapsible first and second rotor assemblies 72, 74 are provided. With specific reference to FIGS. 16-19, each rotor assembly 72, 74, includes a respective hinge assembly 86 that allows the respective rotor assembly 72, 74 to rotate about the respective hinge axis 118, 124. The rotor assemblies 72, 74 include a joint 160. Each hinge assembly 86 is coupled to body 20 via the joint 160. The joint 160 is configured to allow the rotor assembly 72, 74 to rotate about a joint axis 162. A collapsible rotor or propeller 42 is provided. As shown in FIG. 20A, each lift mechanism 40 includes a rotor motor 132, a support base 130 and two blades 42. When not in use, the blades 42 may be folded in a direction towards the shaft assembly 84 (see FIG. 20B). The rotor assemblies 72, 74 may then be rotated about the joint axis 162 such that the rotor assemblies 72, 74 are generally in-line with the body 20 (see FIG. 20).

In an alternative embodiment, a removable outer protective frame (not shown) and/or removable cages, may be used with the collapsible first and second rotor assemblies 72, 74. The removable outer protective frame and/or removable cages need to be removed prior to folding the aerial system 12.

In one embodiment, the outer protective frame 82 is comprising of a relatively flat piece of material, e.g., plastic, that surrounds an outer edge of the rotor assemble 72, 74. With reference to FIG. 9, in one embodiment, the outer protective frame 82 is includes a number of cut-outs along each edge of the outer protective frame 82 and may include a cut-out running the length of the outer protective frame 82. The two sides of the outer protective frame 82 may be connected by one or more stiffeners. This design preserves the strength and protection afforded by the outer protective frame 82 while minimizing weight.

With reference to FIG. 15, in another embodiment of the present invention, the frame assembly 70 has a sinking design in which body 20 rests below the first and second rotor assemblies 72, 74 when the rotor assemblies 72, 74 are in the deployed position 78. As shown, the angle between the transverse axis 92 extending upward from the body 20 and the shaft axis 112 (α1, α2) is less than 90 degrees. This arrangement increases the stability of the aerial system 12 during flight.

With reference to FIGS. 21-24 in one aspect of the present invention, flight of the aerial system 12 is controlled through four independent control variables:

- The rotational speed of the propeller 42 in the first rotor assembly 72 (W2);
- The rotational speed of propeller 42 in the second rotor assembly 74 (W1);
- The angular position of the first rotor assembly 72 relative to the housing 20 along the shaft axis 112 (σ1); and
- The angular position of the second rotor assembly 74 relative to the housing 20 along the shaft axis 112 (σ2).

The rotational speed of the propellers 40 may be independently controlled via control of the respective rotor motors 132. The angular position of the rotor assemblies 72, 74 may be independently controlled via control of the respective servo motor 180. Generally, there are five types of maneuvers that can be accomplished independently for the aerial system 12 through control of the above-mentioned control variables: hovering at a fixed position; ascend/descend vertically; pitch/move forward; roll/move laterally; and yaw horizontally. Each of the maneuvers requires the unique way to manipulate the control variables (see below).

Hovering at a fixed spatial position without aircraft orientation changes requires no net external force/torque. Hovering may be accomplished with $\sigma_1=\sigma_1=0$ and $W_1=W_2$, where the rotational speed of the propellers 42 equals a value that generates lift of half the weight of the aerial system 12. Small adjustments to the values of $\sigma_1$, $\sigma_2$, $W_1$, and $W_2$ may be governed by feedback control methods to maintain the aerial system 12 at such orientation and reject disturbances from wind. The effect of such small adjustments to each value are independent and are described below in the following descriptions of the other four maneuvers.

Ascending/descending in a vertical direction without other aerial system position/orientation changes requires generating net external forces in the vertical direction. In one embodiment of the present invention a method for ascending/descending vertically is described below, however, it should be noted that other methods may be used. Initially, the servo motors 180 and the rotor motors 132 are controlled to place the aerial system 12 in a hover condition, i.e., $\sigma_1=\sigma_2=0$ and $W_1=W_2$. Then, the rotational speed of the propellers 42 are increased simultaneously while keeping $W_1=W_2$. This generates a vertical acceleration and forces the aerial system 12 to ascend. Once a desired vertical position/velocity is achieved, both $W_1$ and $W_2$ may be reduced to enter into the hover mode. To descend from a hover condition, the rotational speed of the propellers 42 may be decreased simultaneously while keeping $W_1=W_2$.

Figure 22A:
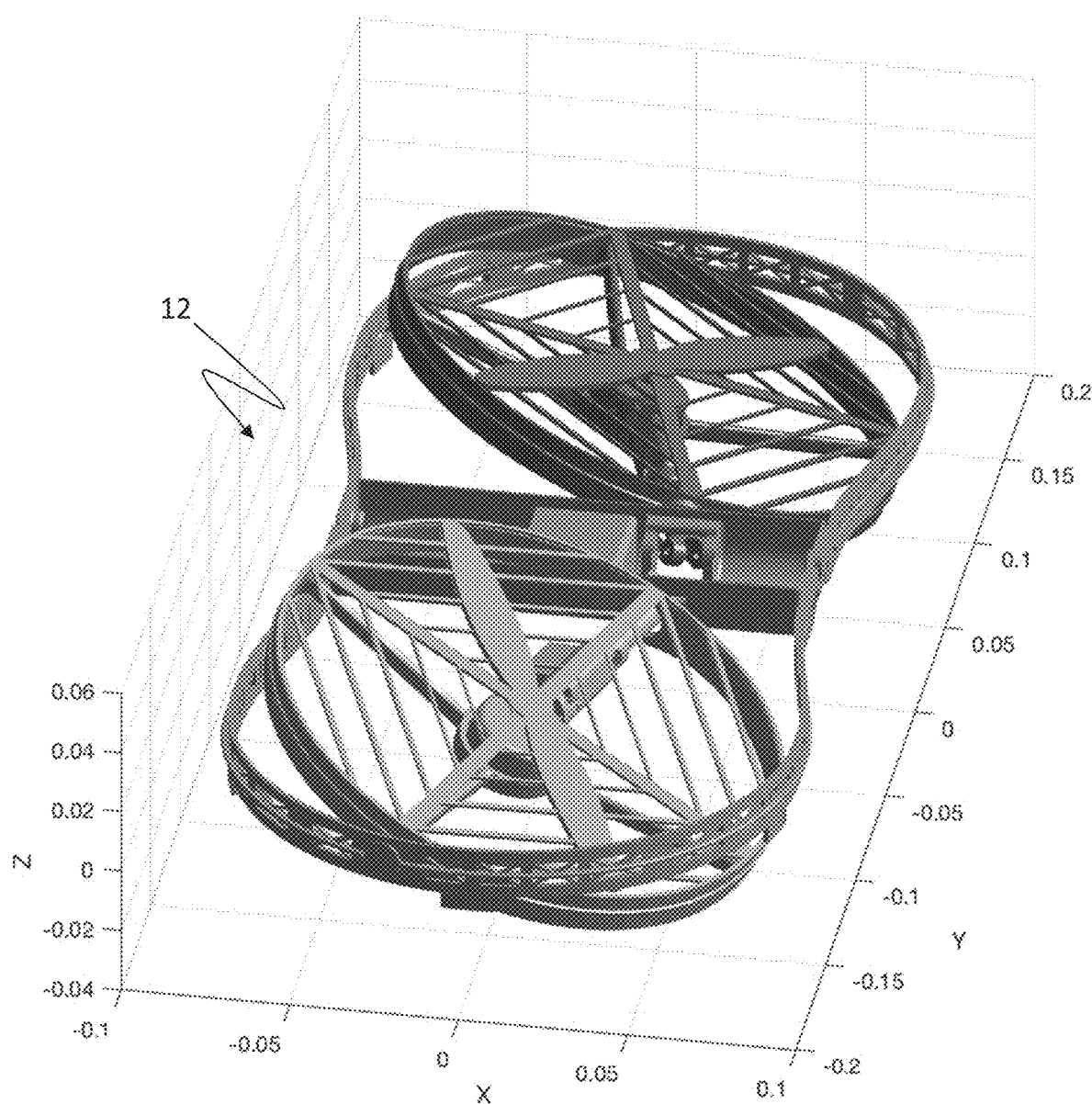
Figure 22B:
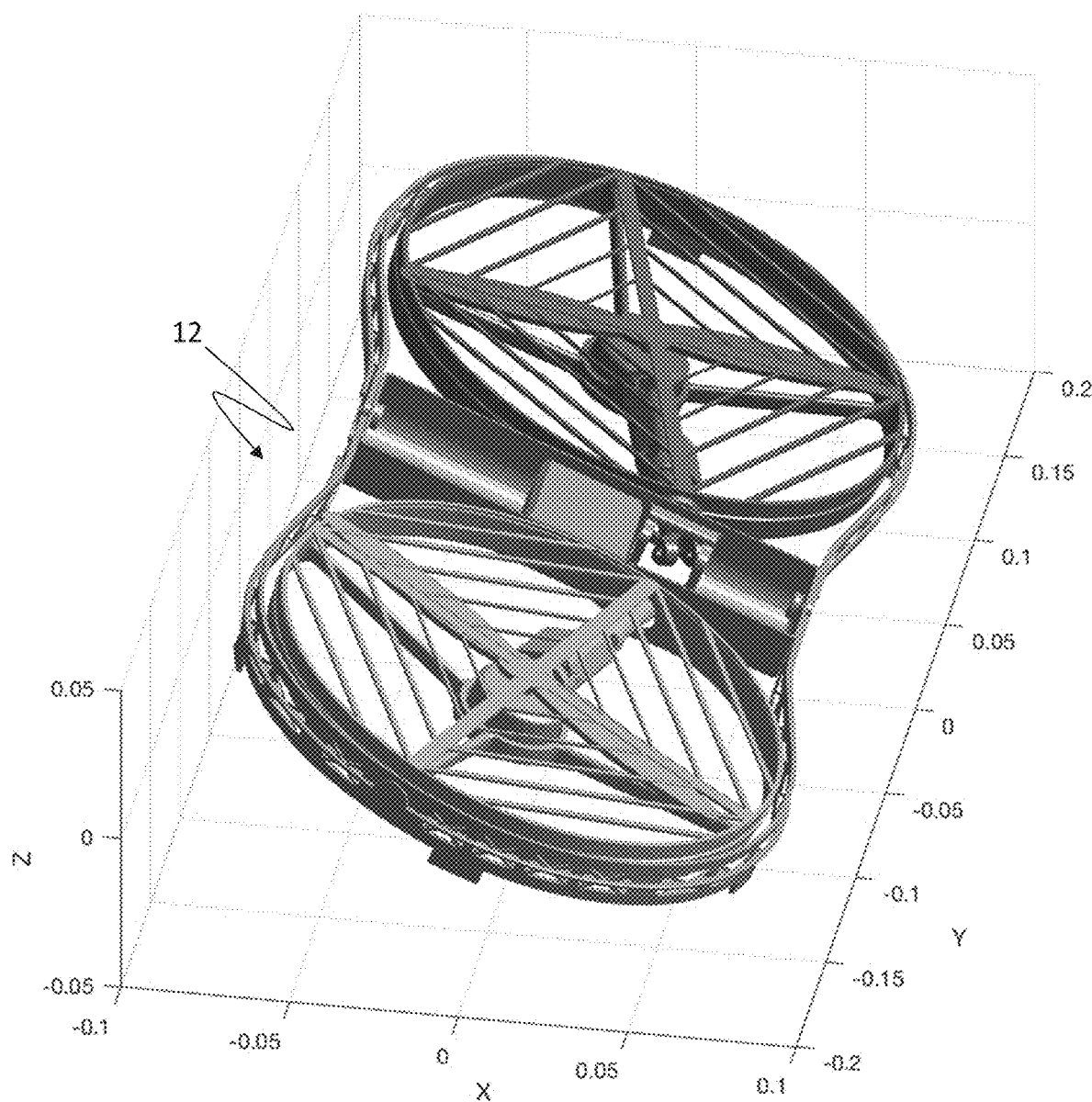

Moving forward requires generating forward accelerations, which in turns requires net external forces that have components in the forward direction. In realistic applications, the forward accelerations will generally need to be maintained for a period of time. This requires the aerial system 12 to maintain the forward force component without changing the orientation of the aerial system 12. As a result, a desired aerial system orientation and angular position of the rotor assemblies 72, 74 must be achieved and maintained. In one embodiment of the present invention a method for moving forward is described below, however, it should be noted that other methods may be used. Initially, the servo motors 180 and the rotor motors 132 are controlled to place the aerial system 12 in a hover condition, i.e., $\sigma_1=\sigma_2=0$ and $W_1=W_2$. Then the rotor assemblies 72, 74 are rotated, i.e., increase $\sigma_1$ and $\sigma_2$, an equal amount. This generates a pitch moment about the aerial system's 12 center of gravity which forces the aerial system 12 to pitch forward. When the desired pitch angle of the aerial system 12 is reached $\sigma_1$ and $\sigma_2$ are returned to zero, which yields/maintains the aerial system's 12 orientation as shown in FIG. 22B. $W_1=W_2$ are maintained and may be adjusted to maintain the vertical position pf the aerial system 12. Small adjustments to $\sigma_1$ and $\sigma_2$ may be made (using feedback control methods) to maintain the aerial system 12 at the desired orientation and reject disturbances from wind.

It should be noted that backward motion may be achieved by rotating the rotary assembles 72, 74 in the opposite direction, i.e., such that $\sigma_1$ and $\sigma_2$ are negative.

It should be noted that the above maneuvers may be combined to achieve more complex maneuvers, such as, but without being limited thereto: moving forward while ascending; moving forward while descending; moving backward while ascending; and moving backward while descending.

Figure 23:
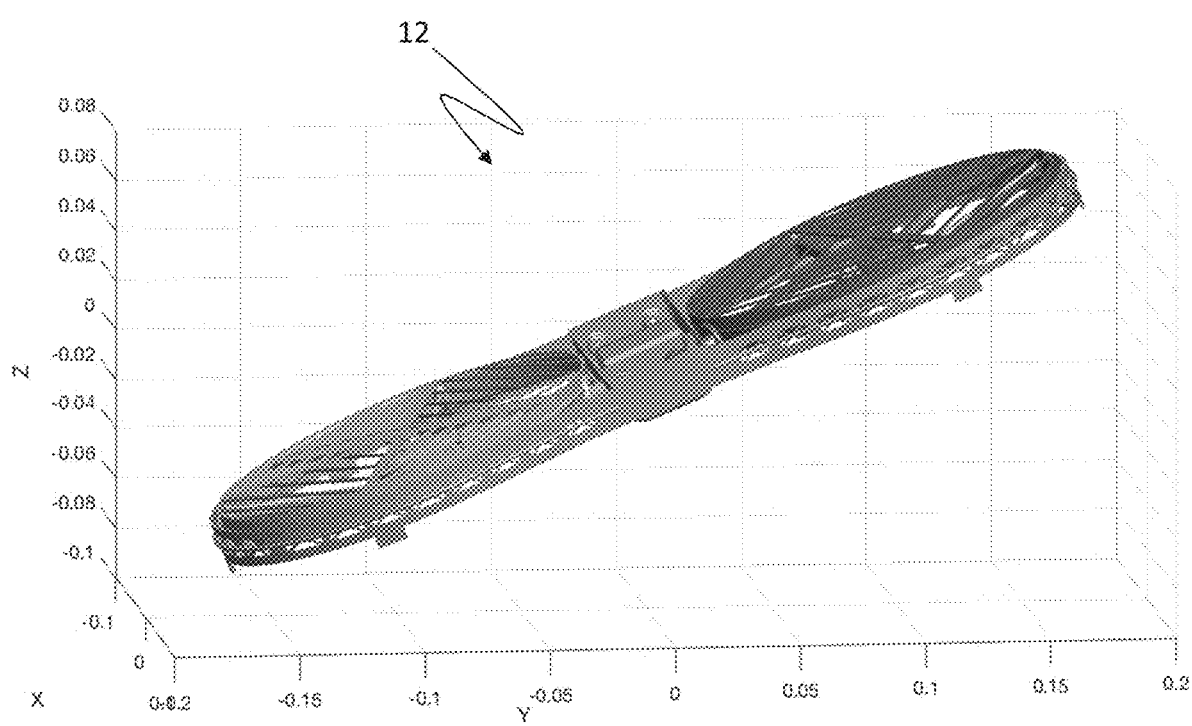

Moving laterally, i.e., causing the aerial system 12 to perform a roll maneuver, requires generating lateral accelerations, which in turns requires net external forces that have component in the lateral direction. In realistic applications, sometimes the lateral accelerations need to be maintained for a period of time, which requires the aerial system 12 to maintain the lateral force component without changing the orientation of the aerial system 12. As a result, a desired orientation and its servo angular position as shown in FIG. 23 needs to be achieved and maintained.

In one embodiment of the present invention a method for performing a roll toward the right is described below, however, it should be noted that other methods may be used. Initially, the servo motors 180 and the rotor motors 132 are controlled to place the aerial system 12 in a hover condition, i.e., $\sigma_1=\sigma_2=0$ and $W_1=W_2$. The rotational speed $W_1$ is increased while keeping $W_2$ generally constant. This generates a roll moment about center of gravity of the aerial system 12, which forces the aerial system to roll toward right. When the desired roll angle of the aerial system 12 is reached, $W_1$ and $W_2$ are set to an equal value such that the combined lift has a vertical component that equals the weight of the aerial system 12 (see FIG. 23). Small adjustments $W_1$ and $W_2$ that are governed by feedback control methods may be used to maintain the orientation of the aerial system and reject disturbances from wind. It should be noted that a roll in the opposite direction may be achieved by reversing that role of $W_1$ and $W_2$ in the above procedure.

Figure 24:
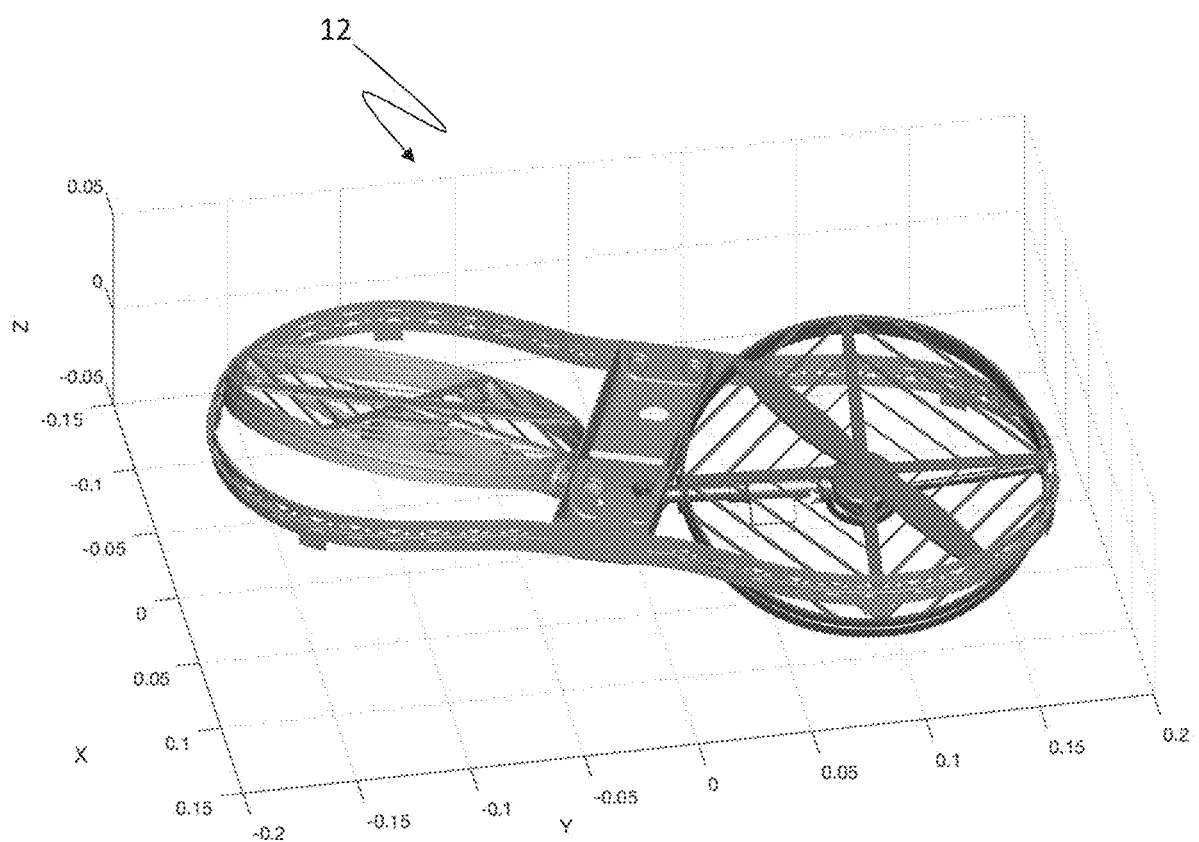

Horizontal yaw requires generating net angular accelerations in the vertical direction, which in turn requires net external torque in the vertical direction. In realistic applications, yaw accelerations need to be achieved and maintained with no aircraft position changes or other aircraft orientation changes. As a result, a desired aircraft orientation and its servo angular position as shown in FIG. 24 needs to be achieved and maintained. In one embodiment of the present invention a method for performing a horizontal yaw maneuver is described below, however, it should be noted that other methods may be used. Initially, the servo motors 180 and the rotor motors 132 are controlled to place the aerial system 12 in a hover condition, i.e., $\sigma_1=\sigma_2=0$ and $W_1$ and $W_2$. We then increase $\sigma_1$ and decrease $\sigma_2$ simultaneously with a same amount, generating a yaw moment about the center of gravity of the aerial system 12. This causes the aerial system 12 to perform a yaw maneuver. When the desired yaw angle of the aerial system 12 is reached, $\sigma_1$ and $\sigma_2$ are decreased to zero. The orientation of the aircraft at this point in shown FIG. 6. The speed of the propellers 42 is maintained and may be adjusted to maintain the vertical position of the aerial system 12. Small adjustments of $\sigma_1$ and $\sigma_2$ are governed by feedback control methods to maintain the aerial system 12 at such orientation and reject disturbances from wind. It should be noted that a yaw in an opposite direction may be achieved by reversing that roles of $\sigma_1$ and $\sigma_2$ in the above procedure.

The application processing system 60 can include one or more application processors. The application processor can be a CPU, GPU, microprocessor, or any other suitable processing system. The application processing system 60 can implemented as part of, or separate from, the vision processing system 56, or be different from the vision processing system 56. The application processing system 60 may be connected to the vision processing system 56 by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively, or additionally, the interface bridge can be a low-throughput and/or bandwidth connection, and can use a SPI protocol, UART protocol, I2C protocol, SDIO protocol, or any other suitable protocol.

The system can optionally include an image signal processing unit (ISP) 62 that functions to pre-process the camera signals (e.g., images) before passing to vision processing system and/or application processing system. The ISP 62 can process the signals from all cameras, the signals from the camera subset, or signals any other suitable source. The ISP 62 can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP 62 can select the pixels associated with an overlapping physical region between two cameras from images of the respective streams (e.g., crop each image to only include pixels associated with the overlapping region shared between the cameras of a stereo-camera pair). The ISP 62 can be a system on a chip with multi-core processor architecture, be an ASIC, have ARM architecture, be part of the vision processing system, be part of the application processing system, or be any other suitable processing system.

The system can optionally include sensors 64 that function to sample signals indicative of system operation. The sensor output can be used to determine system kinematics, process the images (e.g., used in image stabilization), or otherwise used. The sensors 64 can be peripheral devices of the vision processing system 56, the application processing system 60, or of any other suitable processing system. The sensors 64 are preferably statically mounted to the housing but can alternatively be mounted to the host robot or to any other suitable system. Sensors 64 can include: orientation sensors (e.g., IMU, gyroscope, accelerometer, altimeter, magnetometer), acoustic sensors (e.g., microphones, transducers), optical sensors (e.g., cameras, ambient light sensors), touch sensors (e.g., force sensors, capacitive touch sensor, resistive touch sensor), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot 66 that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone, vehicle, robot, security camera, or be any other suitable remote-controllable system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aerial system (e.g., drone) with a WiFi module, a camera, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

The power supply 38 provides a stable power supply for the aerial system 12 and the components therein. The power supply 38 may include protection functions in case of overvoltage, overcurrent and power failure, for example. The power supply 38 can be mounted on the body 20 or on the sensor housing.

Although omitted for conciseness, the illustrated embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

What is claimed is:

1. An aerial system, comprising:
a fuselage body including a pair of opposing sidewalls extending between a first endwall and an opposite second endwall along a longitudinal axis, the pair of opposing sidewalls being spaced apart a distance measured along a lateral axis that is perpendicular to the longitudinal axis; and
a lift assembly including a first rotor assembly extending outwardly from a first sidewall of the pair of opposing sidewalls and a second rotor assembly extending outwardly from a second sidewall of the pair of opposing sidewalls;
the first rotor assembly including:
a first lift mechanism; and
a first shaft assembly coupled between the first lift mechanism and the fuselage body for supporting the first lift mechanism from the fuselage body, the first shaft assembly extending outwardly from the first sidewall at a first oblique angle measured from the longitudinal axis and is pivotably coupled to the first sidewall such that the first rotor assembly is pivotable about a first pivot axis that is parallel to the longitudinal axis;
the second rotor assembly including:
a second lift mechanism; and
a second shaft assembly coupled between the second lift mechanism and the fuselage body for supporting the second lift mechanism from the fuselage body, the second shaft assembly extending outwardly from the second sidewall at a second oblique angle measured from the longitudinal axis and is pivotably coupled to the second sidewall such that the second rotor assembly is pivotable about a second pivot axis that is parallel to the longitudinal axis,
wherein the first shaft assembly extends between a distal end that is coupled to the first lift mechanism and a proximal end that is pivotably coupled to the first sidewall, the proximal end is orientated between a midpoint of the fuselage body defined along the longitudinal axis and the second endwall, and
wherein the first lift mechanism and the second lift mechanism are arranged along the midpoint of the fuselage body defined along the lateral axis in the deployed position.

2. The aerial system of claim 1, wherein each of the first rotor assembly and the second rotor assembly includes a cage for housing the first lift mechanism and the second lift mechanism, respectively,
wherein the cage includes one or more apertures,
wherein the cage and the first rotor assembly rotate about an axis relative to the fuselage body and the first outer protective frame, and
wherein the cage and the second rotor assembly rotate about an axis relative to the fuselage body and the second outer protective frame.

3. The aerial system of claim 1, wherein the proximal end is rotatably coupled to the first sidewall such that the first rotor assembly is rotatable with respect to the fuselage body about a rotational axis that is parallel to the lateral axis.

4. The aerial system of claim 1, wherein the first lift mechanism is orientated along an axis that intersects the midpoint of the fuselage body.

5. The aerial system of claim 1, wherein the lift assembly is positionable between a deployed position and a stowed position, the first lift mechanism is spaced a first distance from the second lift mechanism in the deployed position, and the first lift mechanism is spaced a second distance from the second lift mechanism in the stowed position that is less than the first distance.

6. The aerial system of claim 5, wherein the first lift mechanism includes a first propeller assembly that is rotatable about a first rotational axis and the second lift mechanism includes a second propeller assembly that is rotatable about a second rotational axis, the first propeller assembly is orientated coaxially with the second propeller assembly with the lift assembly in the stowed position.

7. The aerial system of claim 5, wherein the first rotor assembly and the second rotor assembly are orientated at oblique angles measured with respect to the lateral axis with the lift assembly in the deployed position, each of the first rotor assembly and the second rotor assembly includes a shaft assembly coupled to a respective hinge assembly, each shaft assembly includes a lower shaft and an upper shaft, the lower shaft includes two cylinders, and the two cylinders and a third cylinder of the fuselage body are interleaved and coupled to form the respective hinge assembly.

8. The aerial system of claim 1, wherein the lift assembly includes a first outer protective frame extending about a perimeter of the first lift mechanism, the first outer protective frame including an arcuate inner surface extending between a first frame end pivotably coupled to the first endwall and a second frame end pivotably coupled to the second endwall such that the first outer protective frame is pivotable about the first pivot axis.

9. The aerial system of claim 8, wherein the first rotor assembly includes a support strut coupled between the first lift mechanism and the first outer protective frame, the support strut orientated along a shaft assembly centerline axis of the first shaft assembly and rotatably coupled to the first outer protective frame such that the first lift mechanism is rotatable with respect to the outer protective frame about the shaft assembly centerline axis.

10. The aerial system of claim 9, wherein the support strut is coupled to a bottom portion of the first lift mechanism and extends radially outwardly at an oblique angle.

11. A lift assembly for use with an aerial system including a fuselage body, the lift assembly comprising:
a first rotor assembly extending outwardly from a first sidewall of fuselage body and a second rotor assembly extending outwardly from an opposite second sidewall of the fuselage;
the first rotor assembly including:
a first lift mechanism; and
a first shaft assembly coupled between the first lift mechanism and the fuselage body for supporting the first lift mechanism from the fuselage body, the first shaft assembly extending outwardly from the first sidewall at a first oblique angle measured from a longitudinal axis defined along the fuselage body and is pivotably coupled to the first sidewall such that the first rotor assembly is pivotable about a first pivot axis that is parallel to the longitudinal axis;
the second rotor assembly including:
a second lift mechanism; and
a second shaft assembly coupled between the second lift mechanism and the fuselage body for supporting the second lift mechanism from the fuselage body, the second shaft assembly extending outwardly from the second sidewall at a second oblique angle measured from the longitudinal axis and is pivotably coupled to the second sidewall such that the second rotor assembly is pivotable about a second pivot axis that is parallel to the longitudinal axis,
wherein the first shaft assembly extends between a distal end that is coupled to the first lift mechanism and a proximal end that is pivotably coupled to the first sidewall, the proximal end is orientated between a midpoint of the fuselage body defined along the longitudinal axis and the second endwall, and
wherein the first lift mechanism and the second lift mechanism are arranged along the midpoint of the fuselage body defined along the lateral axis in the deployed position.

12. The lift assembly of claim 11, wherein each of the first rotor assembly and the second rotor assembly includes a cage for housing the first lift mechanism and the second lift mechanism, respectively,
wherein the cage includes one or more apertures,
wherein the cage and the first rotor assembly rotate about an axis relative to the fuselage body and the first outer protective frame, and
wherein the cage and the second rotor assembly rotate about an axis relative to the fuselage body and the second outer protective frame.

13. The lift assembly of claim 11, wherein the lift assembly includes a first outer protective frame extending about a perimeter of the first lift mechanism, the first outer protective frame including an arcuate inner surface extending between a first frame end pivotably coupled to the first endwall and a second frame end pivotably coupled to the second endwall such that the first outer protective frame is pivotable about the first pivot axis.

14. The lift assembly of claim 11, wherein the proximal end is rotatably coupled to the first sidewall such that the first rotor assembly is rotatable with respect to the fuselage body about a rotational axis that is perpendicular to the longitudinal axis.

15. The lift assembly of claim 11, wherein the first lift mechanism is orientated along an axis that intersects the midpoint of the fuselage body.

16. The lift assembly of claim 11, wherein the first rotor assembly includes a support strut coupled between the first lift mechanism and the first outer protective frame, the support strut orientated along a shaft assembly centerline axis of the first shaft assembly and rotatably coupled to the first outer protective frame such that the first lift mechanism is rotatable with respect to the outer protective frame about the shaft assembly centerline axis.

17. The lift assembly of claim 16, wherein the support strut is coupled to a bottom portion of the first lift mechanism and extends radially outwardly at an oblique angle.

18. The lift assembly of claim 11, wherein the lift assembly is positionable between a deployed position and a stowed position, the first lift mechanism is spaced a first distance from the second lift mechanism in the deployed position, and the first lift mechanism is spaced a second distance from the second lift mechanism in the stowed position that is less than the first distance.

19. The lift assembly of claim 18, wherein the first lift mechanism includes a first propeller assembly that is rotatable about a first rotational axis and the second lift mechanism includes a second propeller assembly that is rotatable about a second rotational axis, the first propeller assembly is orientated coaxially with the second propeller assembly with the lift assembly in the stowed position.

20. The lift assembly of claim 18, wherein the first rotor assembly and the second rotor assembly are orientated at oblique angles measured with respect to a lateral axis that is perpendicular to the longitudinal axis with the lift assembly in the deployed position, each of the first rotor assembly and the second rotor assembly includes a shaft assembly coupled to a respective hinge assembly, each shaft assembly includes a lower shaft and an upper shaft, the lower shaft includes two cylinders, and the two cylinders and a third cylinder of the fuselage body are interleaved and coupled to form the respective hinge assembly.

* * * * *